United States Patent
Nagase et al.

(10) Patent No.: US 9,791,867 B2
(45) Date of Patent: Oct. 17, 2017

(54) FLOW CONTROL DEVICE EQUIPPED WITH FLOW MONITOR

(71) Applicant: FUJIKIN INCORPORATED, Osaka (JP)

(72) Inventors: Masaaki Nagase, Osaka (JP); Atsushi Hidaka, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 41 days.

(21) Appl. No.: 14/778,398

(22) PCT Filed: Mar. 17, 2014

(86) PCT No.: PCT/JP2014/001504
§ 371 (c)(1),
(2) Date: Sep. 18, 2015

(87) PCT Pub. No.: WO2014/156042
PCT Pub. Date: Oct. 2, 2014

(65) Prior Publication Data
US 2016/0282880 A1    Sep. 29, 2016

(30) Foreign Application Priority Data

Mar. 25, 2013 (JP) ................................. 2013-062537

(51) Int. Cl.
*F16K 31/12* (2006.01)
*G05D 7/06* (2006.01)
(Continued)

(52) U.S. Cl.
CPC ............. *G05D 7/0635* (2013.01); *G01F 1/42* (2013.01); *G01F 1/50* (2013.01); *G01F 15/005* (2013.01); *Y10T 137/7761* (2015.04)

(58) Field of Classification Search
CPC ......... Y10T 137/7761; Y10T 137/7762; Y10T 137/7759; Y10T 137/776; G05D 7/0635;
(Continued)

(56) References Cited

U.S. PATENT DOCUMENTS 4,133,511 A * 1/1979 Hartmann ........... F15B 13/0402
137/487.5
6,302,130 B1    10/2001 Ohmi et al.
(Continued)

FOREIGN PATENT DOCUMENTS

EP    1 035 457 A1    9/2000
JP    2635929 B2    7/1997
(Continued)

OTHER PUBLICATIONS

International Search Report of PCT/JP2014/001504, dated Apr. 8, 2014.

*Primary Examiner* — Jessica Cahill
(74) *Attorney, Agent, or Firm* — Studebaker & Brackett PC

(57) ABSTRACT

A flow control device equipped with flow monitor includes a build-down type flow monitor unit provided on an upstream side, a flow control unit provided on a downstream side of the build-down type flow monitor unit, a signal transmission circuit connecting the build-down type flow monitor unit and the flow control unit and transmitting a monitored flow rate of the build-down type flow monitor unit to the flow control unit, and a set flow rate value adjustment mechanism being provided in the flow control unit and adjusting a set flow rate of the flow control unit based on the monitored flow rate from the build-down type flow monitor unit.

7 Claims, 12 Drawing Sheets

(51) Int. Cl.
*G01F 1/42* (2006.01)
*G01F 1/50* (2006.01)
*G01F 15/00* (2006.01)

(58) Field of Classification Search
CPC .... G05D 7/0623; G01F 1/42; G01F 1/50; G01F 15/005
See application file for complete search history.

(56) References Cited

U.S. PATENT DOCUMENTS

| | | |
|---|---|---|
| 2002/0092564 A1 | 7/2002 | Ollivier |
| 2006/0008328 A1 | 1/2006 | Morgan et al. |
| 2009/0183548 A1 | 7/2009 | Monkowski et al. |
| 2009/0292399 A1* | 11/2009 | Nagase .............. G01F 1/36 700/282 |
| 2010/0127196 A1* | 5/2010 | Sawada .............. F16K 31/007 251/129.06 |
| 2010/0139775 A1* | 6/2010 | Ohmi .............. G01F 1/363 137/12 |
| 2010/0294964 A1* | 11/2010 | Matsumoto .............. F16K 7/14 251/129.01 |
| 2011/0108138 A1 | 5/2011 | Sugita et al. |

FOREIGN PATENT DOCUMENTS

| | | |
|---|---|---|
| JP | 2982003 B2 | 11/1999 |
| JP | 2000-137528 A | 5/2000 |
| JP | 2003-529218 A | 9/2003 |
| JP | 2008-504613 A | 2/2008 |
| JP | 4137666 B2 | 6/2008 |
| JP | 4308356 B2 | 8/2009 |
| JP | 2009-265988 A | 11/2009 |
| JP | 2011-510404 A | 3/2011 |
| WO | 00/11531 A1 | 3/2000 |
| WO | 01/73820 A2 | 10/2001 |
| WO | 2006/014508 A2 | 2/2006 |
| WO | 2009/091935 A1 | 7/2009 |
| WO | 2009-130835 A1 | 10/2009 |
| WO | 2013/179550 A1 | 12/2013 |

* cited by examiner

FLOW CONTROL DEVICE EQUIPPED WITH FLOW MONITOR

FIELD OF THE INVENTION

The present invention relates to an improvement of a flow control device equipped with flow monitor and more specifically relates to a flow control device equipped with flow monitor in which a flow control device having a high pressure-variation-resistance characteristic and a build-down type flow monitor are organically combined, whereby the flow control by the flow control device can be monitored in real time and also, when a difference between the controlled flow rate and the monitored flow rate exceeds a preset value, a set flow rate value on the side of the flow control device can be automatically adjusted.

BACKGROUND OF THE INVENTION

Heretofore, a thermal type flow control device MFC and a pressure-type flow control device FCS have been widely used in a gas supply device for semiconductor control devices. In particular, as illustrated in FIG. 19, the latter pressure-type flow control device FCS is configured from, for example, a control valve CV, a temperature detector T, a pressure detector P, an orifice OL, and a calculation control unit CD containing a temperature correction/flow rate calculation circuit CDa, a comparison circuit CDb, an input/output circuit CDc, an output circuit CDd, and the like and has an outstanding flow rate characteristic which enables stable flow control even when the primary side supply pressure sharply varies.

More specifically, in the pressure-type flow control device FCS of FIG. 19, the detection values from the pressure detector P and the temperature detector T are converted to digital values, and then input into the temperature correction and the flow rate calculation circuit CDa. Herein, the temperature correction and the flow rate calculation of the detected pressure are performed, and then the calculated flow rate value Qt is input into the comparison circuit CDb. An input signal $Q_s$ corresponding to a set flow rate is input from a terminal In, converted to a digital value in the input/output circuit CDc, input into the comparison circuit CDb, and then compared with the calculated flow rate value Qt from the temperature correction/flow rate calculation circuit CDa herein. As a result of the comparison, when the set flow rate input signal Qs is larger than the calculated flow rate value Qt, a control signal Pd is output to a driving unit of the control valve CV. Thus, the control valve CV is driven in the closing direction to be driven in the valve closing direction until a difference (Qs-Qt) between the set flow rate input signal Qs and the calculated flow rate value Qt reaches zero.

In the pressure-type flow control device FCS, when a so-called critical expansion condition of $P_1/P_2 \geq$ about 2 is held between a downstream side pressure $P_2$ and an upstream side pressure $P_1$ of the orifice OL, the flow rate Q of gas flowing through the orifice OL is $Q=KP_1$ (K is a constant) and the flow rate Q can be controlled with high accuracy by controlling the pressure $P_1$ and also an outstanding characteristic is given in which, even when the pressure of the upstream side gas Go of the control valve CV sharply varies, the controlled flow value hardly varies.

The pressure-type flow control device FCS itself is known, and therefore a detailed description thereof is omitted herein.

However, in this kind of the pressure-type flow control device FCS, the orifice OL having a minute hole diameter is employed, and therefore secular changes in the hole diameter of the orifice OL is inevitable. The changes in the hole diameter produce a difference between the set flow rate (i.e., controlled flow rate value) of the pressure-type flow control device FCS and the actual flow rate value of the gas Go which actually flows through the orifice OL. Moreover, in order to detect the difference, so-called flow monitoring needs to be frequently performed, which poses a problem that the operability of a semiconductor manufacturing apparatus, the quality of a manufactured semiconductor, and the like are seriously affected.

Therefore, in the field of the pressure-type flow control device, a measure has been taken heretofore which detects the changes in the hole diameter of the orifice OL as soon as possible at an early stage to thereby prevent the generation of the difference between the controlled flow rate value obtained by the pressure-type flow control device FCS and the actual flow rate value of the gas Go which actually flows through the orifice. For the detection of the changes in the hole diameter of the orifice OL of this kind and the like, gas flow measuring methods employing a so-called build-up system or build-down system have been used in many cases On the other hand, the gas flow measurement employing the build-up system or the build-down system requires temporarily stopping of the supply of actual gas, and thus poses a problem that the gas flow measurement reduces the operating ratio of a semiconductor manufacturing apparatus and gives great influence on the quality and the like of a manufactured semiconductor.

Therefore, in recent years, a development of a flow control device equipped with flow monitor which enables simple real-time monitoring about whether or not the flow control of supply gas is appropriately performed without temporarily stopping the supply of actual gas has been advanced in the field of the flow control device of this kind.

For example, FIG. 20 shows an example thereof, in which a flow control device equipped with flow monitor 20 is configured from a flow passage 23, a first pressure sensor 27a which detects the inlet side pressure, an opening/closing control valve 24, a thermal type mass flow sensor 25, a second pressure sensor 27b, a narrowed portion (sonic nozzle) 26, a calculation control unit 28a, an input/output circuit 28b, and the like.

The thermal type mass flow sensor 25 has a flow straightening body 25a, a branch flow passage 25b which branches the flow rate of a predetermined ratio F/A from the flow passage 23, and a sensor body 25c provided in the branch flow passage 25b, in which a flow rate signal Sf which shows the total flow rate F is output to the calculation control unit 28a.

The narrowed portion 26 is a sonic nozzle which passes a fluid of a flow rate proportional to the upstream side pressure when a pressure difference between the upstream side pressure and the downstream side pressure exceeds a predetermined value (i.e., in the case of fluid flow under a critical condition). In FIG. 20, SPa and SPb denote pressure signals, Pa and Pb denote pressures, F denotes the total flow rate, Sf denotes a flow rate signal, and Cp denotes a valve opening degree control signal.

The calculation control unit 28a feeds back the pressure signals Spa and Spb from the pressure sensors 27a and 27b and the flow rate signal Sf from the flow sensor 25, and then outputs the valve opening degree control signal Cp to thereby feedback-control the opening/closing control valve 24. More specifically, a flow rate setting signal Fs from the input/output circuit 28*b* is input into the calculation control unit 28*a*, so that the flow rate F of a fluid which flows into the flow control device 20 is adjusted to be a flow rate set by the flow rate setting signal Fs.

Specifically, the calculation control unit 28*a* feedback-controls the opening and closing of the opening/closing control valve 24 using an output (pressure signal Spb) of the second pressure sensor 27*b* to thereby control the flow rate F of a fluid which flows through the sonic nozzle 26 and also the flow rate F with which the fluid actually flows is measured using an output (flow rate signal Sf) of the thermal type mass flow rate sensor 25 at this time, whereby an operation of the flow control device 20 is checked.

As described above, in the flow control device equipped with flow monitor 20 of FIG. 20, two kinds of systems of the pressure-type flow control of adjusting the opening degree of the opening/closing control valve 24 using the pressure signal Spb of the second pressure sensor 27*b* and the flow measurement using the thermal type mass flow sensor 25 of monitoring the actual flow rate are built in the calculation control unit 28*a*. Therefore, the flow control device equipped with flow monitor 20 enables simple and secure real-time monitoring about whether or not a fluid of the controlled flow rate corresponding to the set flow rate Fs actually flows, i.e., whether or not there is a difference between the controlled flow rate and the actual flow rate, and thus demonstrates high practical effects.

However, the flow rate control device equipped with flow monitor 20 of FIG. 20 still have a large number of problems to be solved.

As a first problem, when a difference is generated between a monitored flow rate value (actual flow rate value) and a controlled flow rate value, the generation of the difference can be detected by an alarm and the like but the controlled flow rate value cannot be automatically corrected, i.e., the set flow rate value Fs cannot be adjusted. Therefore, when the correction of the controlled flow rate value is delayed due to a certain cause, for example, the absence of an operation staff or the like, supply of gas of a flow rate different from the set flow rate value (gas of the actual flow rate) is continued, which produces various inconveniences in semiconductor manufacturing.

As a second problem, since two different kinds of measurement systems of the pressure-type flow measurement using the second pressure sensor 27*b* for controlling the flow rate and the flow measurement using the thermal type mass flow sensor 25 for monitoring the flow rate are built in, the structure of the flow control device equipped with flow monitor 20 is complicated and a reduction in size of the device and a reduction in the manufacturing cost cannot be achieved.

As a third problem, the flow control device equipped with flow monitor 20 is configured so that the calculation control unit 28*a* controls the opening/closing of the opening/closing control valve 24 using both the signals of the output Spb of the second pressure sensor 27*b* and the flow rate output Sf of the thermal type mass flow sensor 25 and also corrects the flow rate output Sf of the thermal type mass flow sensor 25 using the output Spa of the first pressure sensor 27*a* and that the opening/closing of the opening/closing control valve 24 is controlled using three signals of the two pressure signals of the first pressure sensor 27*a* and the second pressure sensor 27*b* and the flow rate signal from the thermal type mass flow sensor 25. Therefore, there are problems that the configuration of the calculation control unit 28*a* is complicated and also a stable flow control characteristic and outstanding high responsiveness as the pressure-type flow control device FCS are conversely reduced.

CITATION LIST

Patent Literature

Patent Literature 1: Japanese Patent No. 2635929
Patent Literature 2: Japanese Patent No. 2982003
Patent Literature 3: Japanese Patent No. 4308356
Patent Literature 4: Japanese Patent No. 4137666

Technical Problems

It is a main object of the present invention to solve problems: (a), in the case of a former flow control device equipped with flow monitor employing a flow measurement method of a build-down type or a buildup type, there is a necessity of temporarily stopping the supply of actual gas in flow monitoring, which causes a reduction in the operating ratio of a semiconductor manufacturing apparatus, variation of the quality a manufactured semiconductor, and the like; (b), in the case of a former flow control device equipped with flow monitor having a structure in which a thermal type flow meter and a pressure-type flow control device are combined as illustrated in FIG. 20, even when the abnormalities of the actual flow rate are revealed, a set value of the controlled flow rate cannot be automatically corrected, which causes various inconvenience due to the delay in the flow rate correction, which make it difficult to simplify the structure of the flow control device itself and to reduce the size of the device, and which deteriorates an outstanding response characteristic and a stable flow control characteristic of the pressure-type flow control device, and the like.

In order to achieve the object, the present invention provides a flow control device equipped with flow monitor in which a pressure-type flow control device FCS and a build-down type flow measuring unit provided on the upstream side thereof are integrally combined, in which the build-down type flow measuring unit is operated within a pressure variation range permitted in terms of the upstream side pressure (inlet side pressure) of the flow control device to send a flow monitoring signal once within at least 1 second (desirably two or more times for 1 second) from the build-down type flow measuring unit, whereby the flow control by the pressure-type flow control device and the flow monitoring substantially close to real-time monitoring by the build-down type flow measuring unit can be simultaneously performed and also, when a difference between a monitored flow rate value and a controlled flow rate value exceeds a predetermined flow rate value, the set flow rate value on the side of the pressure-type flow control device is automatically adjusted to correct the flow control value by the pressure-type flow control device to the flow rate value obtained by the build-down type flow measuring unit.

More specifically, the present invention provides a flow control device equipped with build-down type flow monitor which enables flow monitoring by the build-down type flow monitor unit under a situation close to nearly real-time (at least once per second) monitoring by fully utilizing the flow rate characteristic of the pressure-type flow control device in which the flow control characteristic is hardly influenced by the variation of the inlet side pressure and which can achieve simplification of an calculation control unit, a sharp reduction in size of a device body, an improvement of gas replacement properties, and the like.

SUMMARY OF THE INVENTION

Solution to the Problem

The present inventors first configured a test device as illustrated in FIG. 1 using a pressure-type flow control device FCS employing an orifice, and then carried out various basic tests relating to the flow measurement by a build-down system of calculating the flow rate from the inclination of a pressure drop between the pressure-type flow control device FCS and a primary side opening/closing switching valve (upstream side valve) AV.

More specifically, in FIG. 1, $N_2$ denotes a gas supply source, RG denotes a pressure regulator, ECV denotes an electromagnetic driving unit, AV denotes a primary side opening/closing switching valve (upstream side valve), FCS denotes a pressure-type flow control device, VP denotes a vacuum pump, BC denotes a build-down capacity, T denotes a temperature sensor, P denotes a pressure sensor provided on the primary side of a control valve in the pressure-type flow control device FCS, $P_0$ denotes a pressure sensor output, E denotes a power supply unit, $E_1$ denotes a power supply for pressure-type flow control device, $E_2$ denotes a power supply for calculation control unit, $E_3$ denotes a power supply for primary side opening/closing switching valve (upstream side valve), S denotes a signal generator, CP denotes a calculation control unit, CPa denotes a pressure-type flow rate calculation control unit, CPb denotes a build-down monitored flow rate calculation control unit, PC denotes a calculation displaying unit, and NR denotes a data logger.

The build-down capacity BC is equivalent to the pipeline space capacity between the outlet side of the primary side opening/closing switching valve (upstream side valve) AV and the inlet side of the control valve (not illustrated) of the pressure-type flow control device FCS. The device is configured so that, by the adjustment of the length, the internal diameter, and the like of the pipeline or the adjustment of the internal volume of a build-down chamber (not illustrated) interposed in the pipeline, the internal volume V of the build-down capacity BC can be switched and adjusted to any one of capacities of 1.78 cc and 9.91 cc, 4.6 cc to 11.6 cc, and 1.58 cc to 15.31 cc.

When the build-down chamber is used, the flow passage internal diameter between the outlet of the primary side opening/closing switching valve (upstream side valve) AV and the inlet of the control valve CV was set to 1.8 mm and the internal volume V of the build-down capacity BC is selected in the range of 1.58 cc to 15.31 cc as described in Example described later.

The build-down monitored flow rate calculation control unit CPb in the calculation control unit CP calculates the monitored flow rate using the pressure drop rate in the build-down capacity BC as described later and the pressure-type flow rate calculation control unit CPa calculates the flow rate in an orifice (not illustrated), controls the opening/closing of the control valve (not illustrated), and the like in the same manner as in a controlling and calculating unit of a former pressure-type flow control device FCS.

The pressure-type flow control device FCS, the primary side opening/closing switching valve (upstream side valve) AV, the pressure regulator RG, and other devices are all known, and therefore a description thereof is omitted herein.

Moreover, the primary side opening/closing switching valve (upstream side valve) AV needs to perform the opening/closing within a short time, and therefore a piezoelectric driving type metal diaphragm valve and a direct acting type electromagnetic valve are used but an air operation valve having a pilot electromagnetic valve may be acceptable.

A reason why the build-down type flow measuring unit can be disposed on the upstream side of the pressure-type flow control device FCS lies in the fact that the pressure-type flow control device FCS employing the orifice is hardly affected by a gas supply pressure variation as described above. Moreover, it is known that the build-down system enables high-accuracy flow measurement.

More specifically, in the build-down system, the flow rate Q in the build-down capacity BC of an internal volume V (l) can be calculated by the following equation (1).

$$Q(\text{sccm}) = \frac{1(\text{atm})}{760 \,(\text{Torr})} \times 1000 \,(\text{cc/l}) \times 60 \,(\text{sec/min}) \times \frac{273(K)}{(273+T)(K)} \times V(l) \times \frac{\Delta p(\text{Torr})}{\Delta t(\text{sec})} \quad [\text{Equation (1)}]$$

In Equation (1), V represents the internal volume (l) of the build-down capacity BC, $\Delta P/\Delta t$ represents the pressure drop rate in the build-down volume V, and T represents a gas temperature (° C.).

First, using the test device of FIG. 1, the upstream side pressure of the pressure-type flow control device FCS was set to 400 kPa abs. and the dropped pressure (pressure difference $\Delta P$) was set to 50 kPa abs. or more and also the internal volume V of the build-down capacity BC was set to 4.6 to 11.6 cc, and then the flow measurement by the build-down system was performed. FIG. 2 shows the pressure drop state at this time and showed that the flow rate itself can be measured with relatively good accuracy but, since a pressure recovery time (a) is required, the output of the measured flow rate becomes discontinuous and the time required for one cycle is several seconds or more.

More specifically, in the case where the primary side opening/closing switching valve (upstream side valve) AV is opened and the time until the pressure reaches a pressure equal to or higher than a specified value is defined as the pressure recovery time (a) and the primary side opening/closing switching valve (upstream side valve) AV is closed and the time until the pressure drops to a value equal to or lower than a specified value is defined as a flow rate outputtable time (b), the ratio of the time while the flow rate can be output is determined based on the ratio of the time (a) and the time (b). It was also found that the flow rate outputtable time (b) is determined based on the controlled flow rate of the FCS, the internal volume V of the build-down capacity, and the pressure drop range $\Delta P$, and therefore unless the controlled flow rate of the FCS, the internal volume V of the build-down capacity, and the pressure drop range $\Delta P$ each are more strictly examined to be set to an appropriate value, the flow measurement by the build-down system cannot be brought close to real-time flow monitoring.

On the other hand, in order to achieve real-time flow monitoring, a continuous flow rate output is ideally indispensable. However, in the actual operation of a semiconductor manufacturing apparatus and the like, nearly real-time flow monitoring can be achieved when at least one or more flow rate outputs can be obtained for 1 second.

Then, in order to obtain at least one or more flow rate outputs for 1 second to achieve nearly real-time flow monitoring in the flow measurement by the build-down system, the present inventors reached an idea of further reducing the pressure difference $\Delta P$ and the internal volume V of the build-down capacity to shorten the time (pressure recovery time (a)) required for gas re-charging and also examined whether or not the real-time property can be secured by the reduction in the internal volume V of the build-down capacity BC and the pressure difference ΔP in the flow measurement based on the idea and also carried out various tests on the flow monitoring accuracy, the reproducibility thereof, and the like.

[Test 1]

First, in the test device of FIG. 1, three FCSs each having a rated flow rate of F20, F200, or F600 (sccm) were prepared as the pressure-type flow control device FCS.

The internal volume V of the build-down capacity BC was set to two internal volumes of about 1.78 cc and about 9.91 cc. In the build-down capacity BC of the internal volume V of 9.91 cc, the capacity was adjusted by adjusting the length and the internal diameter of a pipe.

The target of the flow rate output detectable time (b) was set to 0.5 sec (0.25 ms×2000 points) and the test atmosphere temperature was set to 23° C.±1° C.

Next, the FCS upstream side pressure was set to 370 kPa abs., the pressure difference was set to ΔP=20 kPa abs., and the $N_2$ flow rate was set to 100 sccm (set by the FCS), and then the pressure recovery characteristic (pressure recovery time (a)) in the build-down flow measurement was measured.

FIG. 3 shows the measurement results of the pressure recovery characteristic and FIG. 4 is an enlarged view thereof.

FIG. 5 shows the pressure drop characteristic at that time.

As is clear from FIG. 3 and FIG. 4, it was able to be confirmed that, by reducing the internal volume V of the build-down capacity BC to 1.78 cc and the pressure drop range ΔP to 20 kPa abs., the re-charging time (pressure recovery time (a)) was able to be sharply shortened even when the $N_2$ flow rate was 100 sccm. As shown in FIG. 5, the measurement flow rate was able to be output at intervals within at least 1 second.

In relation to Test 1, it was found that the opening/closing rate of the primary side opening/closing switching valve (upstream side valve) AV has great influence on a reduction in the pressure recovery time (a) with respect to the flow rate outputtable time (b). Therefore, it was found that the primary side opening/closing switching valve (upstream side valve) AV is desirably a piezoelectric drive type metal diaphragm valve or an electromagnetic direct acting type valve.

It was also found that the shortening of the pressure recovery time (a) due to the reduction in the pressure drop range ΔP and the internal volume V of the build-down capacity BC causes shortening of the pressure drop time (flow rate outputtable time (b)), and therefore the relationship between the measured flow rate, the internal volume V of the build-down capacity BC, and the pressure drop time (b) is particularly important.

TABLE 1

Gas flow rate and Drop time per cycle
in build-down capacity of 1.78 cc

| Flow rate (sccm) | Drop time (s) |
| --- | --- |
| 5 | 4.22 |
| 10 | 2.11 |
| 50 | 0.42 |
| 100 | 0.21 |

Table 1 shows the relationship between the measured flow rate (sccm) and the pressure drop time (sec) when the internal volume V of the build-down capacity BC was set to 1.78 cc and shows that, when the internal volume V of the build-down capacity BC is 1.78 cc, it becomes difficult to perform one or more flow rate outputs within 1 second unless the flow rate is 50 sccm or less, which makes it difficult to perform flow monitoring equivalent to real-time monitoring.

On the other hand, the pressure drop characteristic in the flow rate outputtable time (b) needs to have linearity in terms of a measurement error and the range in which the flow rate can be calculated is limited to a range in which the pressure drop rate is constant (i.e., portion having linearity).

FIG. 6 to FIG. 8 show the results of examining the form of the pressure drop characteristic when the measured flow rates were 100, 50, and 10 sccm in Test 1, and, in any case, the pressure drop characteristic lost linearity immediately after build-down. The build-down capacity BC in this case is 1.78 cc and a fluid is $N_2$ gas.

It is assumed that the deviation from the linearity immediately after the build-down shown in FIG. 6 to FIG. 8 above originates from the internal temperature changes of the gas due to the adiabatic expansion of the gas in connection with the pressure changes. It is found that the deviation from the linearity tends to become larger as the measured flow rate is smaller, and thus the time width in which the flow rate can be calculated is narrowed.

Next, the flow measurement error due to the deviation from the linearity of the pressure drop characteristic curve was measured by measuring the flow rate at five points every 0.25 second about the case where the flow rate measurable time (b) was within 1 second.

More specifically, the internal volume V of the build-down capacity BC was set to 1.78 cc and 9.91 cc, the pressure drop range ΔP was set to 20 kPa abs., and the time until the flow rate became stable after the closing of the primary side opening/closing switching valve (upstream side valve) AV was set to 1 second, and then the flow rate was calculated every 0.25 sec, and then the error of the calculated flow rate to the controlled flow rate was examined.

FIG. 9 and FIG. 10 show the results and showed that, in any case, when 0.25 sec or more passed after the closing of the primary side opening/closing switching valve (upstream side valve) AV, the error sharply decreased. More specifically, it was confirmed that the error decreased as the pressure drop characteristic curve approached a straight line.

Table 2 shows the relationship between the internal volume of the build-down capacity BC, the measured flow rate, and the pressure drop time (b) and shows that, when the internal volume V of the build-down capacity BC is 1.78 cc, the flow rate can be output at intervals within about 1 second when the flow rate is 20 to 50 sccm.

It is also found that, when the internal volume V of the build-down capacity BC is 9.91 cc, the flow rate can be output at intervals within about 1 second when the flow rate is 100 to 200 sccm.

TABLE 2

| Pressure drop range ΔP = 20 kPa abs. | |
|---|---|
| Flow rate (sccm) | Drop time (s) |
| Build-down capacity BC: 1.78 cc | |
| 5 | 4.22 |
| 10 | 2.11 |
| 20 | 1.05 |
| 50 | 0.42 |
| Build-down capacity BC: 9.91 cc | |
| 50 | 2.35 |
| 100 | 1.17 |
| 200 | 0.59 |

Furthermore, the flow rate accuracy when the measurement corresponding to FIG. 9 was repeatedly performed was examined in order to confirm the reproducibility.

More specifically, the flow rate calculation (three points) was performed at intervals of 0.5 to 1 sec after closing the primary side opening/closing switching valve (upstream side valve) AV. The flow rate calculation is performed using data from the final point to 0.5 sec when the drop time is less than 1 sec and using data (two points) for 0.25 second about 50 sccm (V=1.78 cc) and 200 sccm (V=9.91 cc) of Table 2.

FIG. 11 shows measurement data of the flow rate accuracy when the measurement was repeatedly performed (10 times) and shows that, when the pressure drop time (b) is 0.5 second or less, the flow rate calculation is performed in a nonlinear region of the pressure drop characteristic curve as illustrated in FIG. 7, and therefore the flow rate error tends to appear in the plus direction as illustrated in FIG. 11.

The flow rate Q obtained by the build-down system has a relationship of Q=Kx (Build-down capacity×Pressure drop rate×1/temperature) as is clear from Expression (1) above. As a result, even when a temperature drop arises due to the adiabatic expansion resulting from pressure changes, it is assumed that the pressure drop rate becomes large and the calculated flow rate Q becomes constant but, in actual, the calculated flow rate increases. It is assumed that this is because the gas temperature is measured on the outer surface of the body of the pressure-type flow control device FCS, and therefore the measured temperature value tends to be governed by room temperature and also the heat capacity of a temperature sensor is large although the heat capacity of the gas itself is small, and therefore the gas temperature is not correctly measured The present invention was created on the basis of the results of the tests described above and is configured from a build-down type flow monitor unit BDM provided on the upstream side, the pressure-type flow control unit FCS provided on the downstream side thereof, a signal transmission circuit CT which connects the build-down type flow monitor unit BDM and the pressure-type flow control unit FCS and transmits the monitored flow rate Q of the build-down type flow monitor unit BDM to the pressure-type flow control unit FCS, and a set flow rate value adjustment mechanism $Q_s R$ which is provided in the pressure-type flow control unit FCS and adjusts the set flow rate $Q_s$ of the pressure-type flow control unit FCS based on the monitored flow rate Q from the build-down type flow monitor unit BDM.

The pressure-type flow control unit FCS can serve as a flow control unit containing a pressure sensor.

The set flow value adjustment mechanism $Q_s R$ can serve as a set flow rate value adjustment mechanism of a configuration of having a comparator of the monitored flow rate Q and the set flow rate $Q_s$ and automatically correcting the set flow rate $Q_s$ to the monitored flow rate Q when a difference between the monitored flow rate Q and the set flow rate $Q_s$ exceeds a preset value.

The build-down type flow rate monitor unit BDM can be configured to have a primary side opening/closing switching valve $PV_1$ which opens/closes a flow of gas from a gas supply source, a build-down capacity BC which is connected to the outlet side of the primary side opening/closing switching valve $PV_1$ and which has a predetermined internal volume V, a temperature sensor which detects the temperature of gas flowing through the build-down capacity BC, a pressure sensor $P_3$ which detects the pressure of the gas flowing through the build-down capacity BC, and a monitored flow rate calculation control unit CPb which controls opening/closing of the primary side opening/closing switching valve $PV_1$ and also calculates and outputs a monitored flow rate Q by a build-down system by setting the gas pressure in the build-down capacity BC to a set upper limit pressure value by opening the primary side opening/closing switching valve $PV_1$, and then dropping the gas pressure to a set lower limit pressure value after the passage of a predetermined time t second by closing the primary side opening/closing switching valve $PV_1$ and is configured to calculate the monitored flow rate Q by Expression 2 below, $$Q = \frac{1000}{760} \times 60 \times \frac{273}{(273+T)} \times V \times \frac{\Delta p}{\Delta t} \quad \text{[Expression 2]}$$

(in which T represents the gas temperature (° C.), V represents the internal volume (l) of the build-down capacity BC, ΔP represents the pressure drop range (Set upper limit pressure value−Set lower limit pressure value) (Torr), and Δt represents the time (sec) from the closing to the opening of the primary side opening/closing switching valve AV).

The pressure-type flow control unit FCS can serve as the pressure-type flow volume control device FCS containing the control valve CV, the orifice OL or a critical nozzle, a pressure gauge $P_1$ or a pressure gauge $P_2$, and the flow rate calculation control unit CPa and having a pressure-variation-resistance characteristic.

The internal volume V of the build-down capacity BC can be set to 0.5 to 20 cc, the set upper limit pressure value can be set to 400 to 100 kPa abs., the set lower limit pressure value can be set to 350 kPa abs. to 50 kPa abs., and the predetermined time t can be set to be within 0.5 to 5 seconds.

As the primary side opening/closing switching valve AV, a piezoelectric drive type metal diaphragm valve or an electromagnetic direct acting type electric operated valve can be used and also the recovery time of the gas pressure from the set lower limit pressure value to the set upper limit pressure value by the opening of the primary side opening/closing switching valve AV can be sharply shortened than the gas pressure drop time from the set upper limit pressure value to the set lower limit pressure value sharply by the closing of the primary side opening/closing switching valve AV by opening and closing the valve at high speed.

A configuration may be acceptable in which the flow rate calculation control unit CPa of the pressure-type flow control unit FCS and the calculation control unit CPb of the build-down type flow monitor unit BDM are integrally formed.

A configuration may be acceptable in which a chamber is used as the build-down capacity BC, the chamber has an inner cylinder and an outer cylinder which are concentrically arranged and fixed, a space between the inner and outer cylinders forming the chamber is used as a gas flow passage, and a pressure sensor $P_3$ is provided in the chamber.

Advantageous Effects of the Invention

In the present invention, the flow control device equipped with flow monitor is configured from the build-down type flow monitor unit BDM provided on the upstream side, the pressure-type flow control unit FCS provided on the downstream side of the build-down type flow monitor unit BDM, the signal transmission circuit CT which connects the build-down type flow monitor unit BDM and the pressure-type flow control unit FCS and transmits the monitored flow rate Q of the build-down type flow monitor unit BDM to the pressure-type flow control unit FCS, and the set flow rate value adjustment mechanism $Q_sR$ which is provided in the pressure-type flow control unit FCS and adjusts the set flow rate $Q_s$ of the pressure-type flow control unit FCS based on the monitored flow rate Q from the build-down type flow monitor unit BDM and is configured to automatically adjust the set flow rate value of the pressure-type flow control unit FCS based on the monitored flow rate of the build-down type flow volume monitor unit BDM.

As a result, a state where the monitored flow rate value (actual flow rate value in the orifice) is greatly different from the set flow rate value (controlled flow rate value) of the pressure-type flow control unit FCS does not continue over a long period of time, so that a large number of effects are obtained in terms of an increase in the quality and the like of semiconductor products.

Moreover, the flow control device equipped with flow monitor is configured so that the build-down type flow monitor unit BDM is provided on the upstream side of the pressure-type flow control unit FCS and that the pressure drop value (pressure difference $\Delta P$), the pressure drop time ($\Delta t$), and the internal volume V of the build-down capacity BC are set in such a manner that the pressure drop $\Delta P$ corresponding to the gas pressure difference within the range in which the inlet side pressure variation of the pressure-type flow control unit FCS is permitted is caused to occur in the build-down capacity BC at a ratio of 1 or more times for 1 second utilizing high responsiveness to the inlet side pressure variation of the pressure-type flow control device and the monitored flow rate can be calculated and output 1 or more times for 1 second from the pressure drop rate $\Delta P/\Delta$, the internal volume V of the build-down capacity BC, and the gas temperature K.

As a result, by setting the pressure drop value (pressure difference) $\Delta P$ to about 20 to 30 kPa abs., the pressure drop time $\Delta t$ to about 0.5 to 0.8 sec, and the internal volume V of the build-down capacity BC to 1.8 to 18 cc, the monitored flow rate can be calculated and output with high accuracy at a ratio of 1 or more times per at least 1 second, and nearly real-time flow monitoring with high accuracy can be achieved in spite of the use of the build-down system.

As compared with the system combined with a former thermal type flow sensor, a sharp simplification and a reduction in size and the manufacturing cost of the pressure-type flow control device equipped with flow monitor can be achieved, so that the added value of the flow control device equipped with flow monitor remarkably increases.

DETAILED DESCRIPTION OF THE INVENTION

Hereinafter, an embodiment of the present invention is described based on the drawings.

Figure 12:
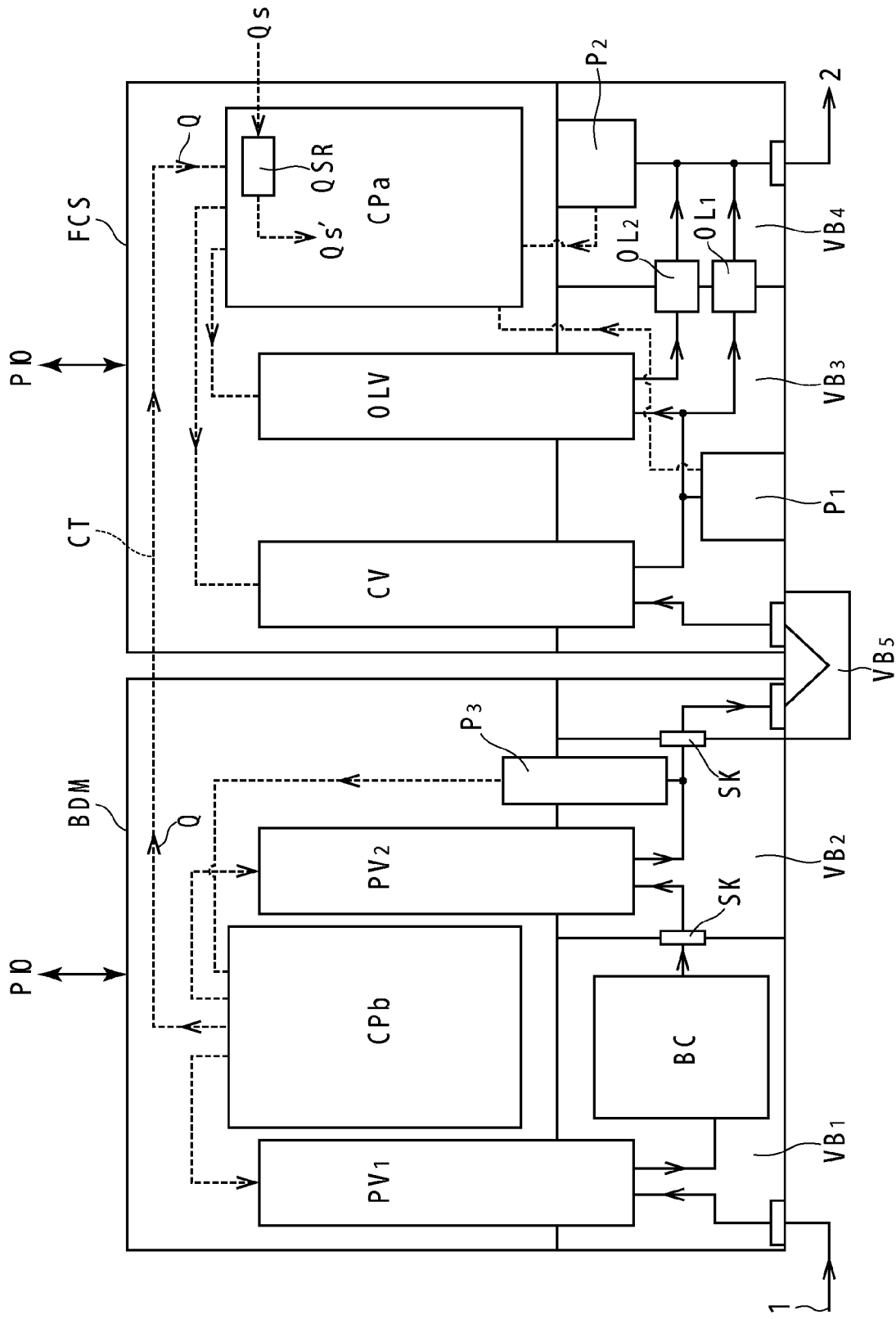
FIG. 12 is a diagram showing the basic configuration of a pressure-type flow control device equipped with flow monitor according to the present invention.

FIG. 12 is a diagram showing the basic configuration of a pressure-type flow control device equipped with flow monitor according to the present invention. The flow control device equipped with flow monitor is configured from a signal transmission circuit (Digital-communication circuit) CT which connects a build-down unit BDM and a pressure-type flow control unit FCS.

In FIG. 12, $PV_1$ denotes an inlet side switching valve, $PV_2$ denotes an outlet side switching valve, BC denotes a build-down capacity, $P_3$ denotes a pressure difference detecting pressure sensor, CPb denotes a monitored flow rate calculation control unit, $VB_1$ denotes a monitor inlet side block, and $VB_2$ denotes a monitor outlet side block.

In FIG. 12, CV denotes a control valve, CPa denotes a flow rate calculation control unit, $OL_1$ denotes a small-diameter orifice, $OL_2$ denotes a large-diameter orifice, $P_1$ denotes a first pressure sensor, $P_2$ denotes a second pressure sensor, $VB_3$ denotes a flow control unit inlet side block, $VB_4$ denotes a flow control unit outlet side block, $VB_5$ denotes a connecting block, and SK denotes connecting gaskets of a connection portion.

Furthermore, the pressure-type flow control unit FCS is provided with a set flow rate adjustment mechanism $Q_s$ R, in which, when a preset flow rate value $Q_s$ is compared with a build-down flow rate Q input through the signal transmission circuit CT by a comparator (not illustrated), and a difference between the values reaches a specified flow rate value, the set flow rate value $Q_s$ is automatically corrected to $Q_s'$, and the flow control value of the pressure-type flow control unit FCS is adjusted to be coincident with the build-down flow rate Q. More specifically, the actual flow rate is adjusted to be coincident with the build-down flow rate Q.

In FIG. 12, the temperature detection sensor T, the filter F, and the like are omitted and it is a matter of course that the pressure-type flow control unit FCS may be any type, e.g., one orifice is provided. The basic configurations themselves of the pressure-type flow control unit FCS and the build-down type flow monitor unit BDM are known, and therefore a detailed description thereof is omitted herein.

Referring to FIG. 12, gas having a pressure of 500 to 320 kPa abs. flowing into the build-down type flow rate monitor unit BDM from a gas inlet 1 flows through the inlet side piezoelectric switching valve $PV_1$, the build-down capacity BC of a chamber type, and the outlet side piezoelectric switching valve $PV_2$ in this order, the monitored flow rate Q is calculated in the monitored flow rate calculation control unit CPb, and then the calculated value is input into the set flow rate adjustment mechanism $Q_s$R of the pressure-type flow control unit FCS.

The gas flowing out of the build-down type flow monitor unit BDM passes through the control valve CV and the small-diameter orifice $OL_1$ and/or the large diameter orifice $OL_2$, and then flows out of a gas outlet 2. During the passing of the gas, the flow rate calculation control unit CPa calculates the orifice flow gas flow rate and also controls the opening/closing of the control valve CV and the opening/closing of the orifice switching valve OLV.

Furthermore, in the set flow rate adjustment mechanism $Q_s$ R of the flow rate calculation control unit CPa, when the monitored flow rate Q from the build-down type flow monitor unit BDM and the orifice flow rate (i.e., controlled flow rate in the flow rate calculation control unit CPa) are compared and a difference between the flow rates exceeds a preset value defined beforehand, the set flow rate $Q_s$ is adjusted so that the controlled flow rate of the pressure-type flow control unit FCS is coincident with the monitored flow rate Q, and then automatically corrected to $Q_s'$.

More specifically, the build-down type flow monitoring control unit CPb forming a principal portion of the present invention controls the opening/closing of the inlet side (upstream side) piezoelectric switching valve $PV_1$ and calculates the build-down flow rate Q from the difference pressure detection pressure sensor $P_3$, the temperature detection sensor T (omitted in FIG. 12), the volume V of the buildup capacity BC between the switching valve $PV_1$ and $PV_2$, and the like, and then outputs the calculated build-down flow rate Q to the flow rate calculation control unit CPa.

As described above, in the flow control device equipped with flow monitor according to the present invention, the measurement of the pressure drop rate $\Delta P/\Delta t$ and the calculation of the monitored flow rate Q are performed in the build-down type flow monitor unit BDM and a command signal and/or a setting signal is input into the monitored flow rate calculation control unit CPb through an external input/output circuit PIO, whereby the monitored flow rate is displayed on a monitor at a rate of at least 1 time for 1 second and also the correction and the compensation of the controlled flow rate value of the pressure-type flow control unit FCS are automatically performed.

The pressure-type flow control device FCS and the build-down type flow monitor unit BDM themselves are known, and therefore a detailed description thereof is omitted herein.

When a difference equal to or higher than a preset value arises between the monitored flow rate output Q (flow rate output from the monitored flow rate calculation control unit CPb) and the flow rate output (flow rate output from the pressure-type flow rate calculation control unit CPa) of the pressure-type flow control unit FCS, an alarm about the abnormalities in the flow rate can be issued or, as necessary, a cause and a generation place of the abnormalities in the flow rate can be specified by performing so-called flow rate self-diagnosis of the pressure-type flow control device FCS and furthermore, when a flow rate difference equal to or higher than a preset value arises, zero point adjustment and the like of the pressure-type flow control unit FCS itself can be carried out, for example.

In this embodiment, as the inlet (upstream) side switching valve and the like, a piezoelectric drive type valve is used but a direct acting type electromagnetic driving valve may be used. The internal volume V of the build-down capacity BC is selected in the range of 1.78 to 9.91 cc. This embodiment has a configuration in which the pressure drop range $\Delta P$ is selected in 20 kPa abs. (350 to 320 kPa abs.) and the monitored flow rate is output 1 or more times for at least 1 second. In addition, as the temperature detection sensor T (not illustrated), an outer surface attaching type temperature measuring resistance type temperature sensor is used but a thermostat type thermometer which is inserted into the monitor inlet side block $VB_1$ or the monitor outlet side block $VB_2$ can be used.

In this embodiment, a chamber equipped with pressure sensor is used as the build-down capacity BC as described later. However, a configuration may be acceptable in which the build-down capacity BC is formed corresponding to the internal volume of a gas flow passage and the internal diameter and the length of the flow passage are selected as appropriate, whereby the build-down capacity BC having a desired internal volume V is obtained.

EXAMPLE

Figure 13:
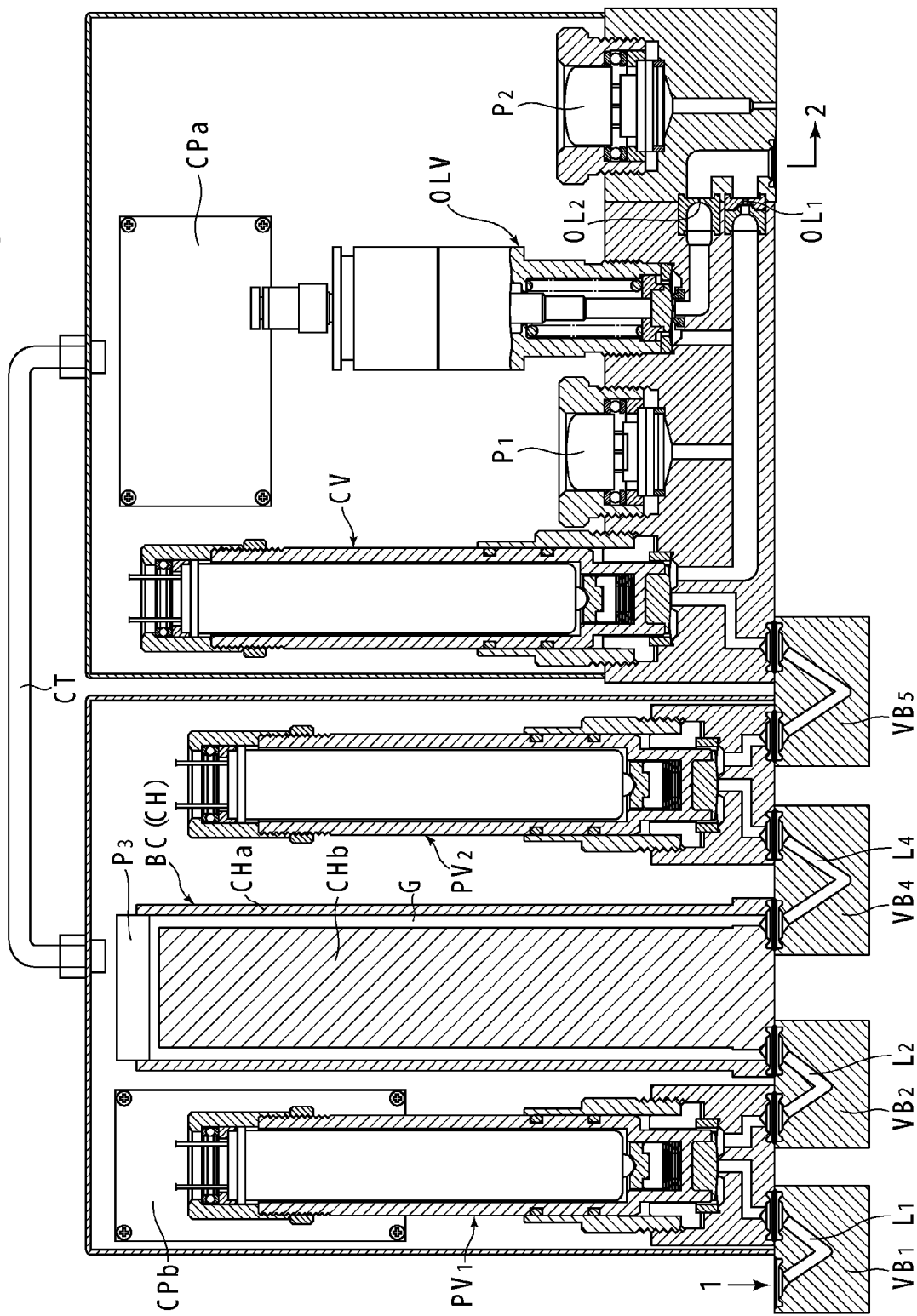
FIG. 13 is a vertical cross-sectional schematic view of the build-down-type pressure-type flow control device equipped with flow monitor according to the present invention.

FIG. 13 is a vertical cross-sectional schematic view of a flow control device equipped with build-down type flow monitor according to Example of the present invention. In this example, a chamber CH equipped with pressure sensor is used as the build-down capacity BC and the internal diameter of each of gas passages $L_1$, $L_2$, and $L_4$ of the build-down type flow monitor unit BDM is set to a small diameter of 1.8 mm. On the downstream side of the orifices $OL_1$ and $OL_2$, a second pressure sensor $P_2$ is separately formed. Furthermore, a pressure difference detecting pressure sensor $P_3$ is provided in the chamber CH.

More specifically, this example has a configuration in which the pressure chamber CH of a small size is provided between the inlet side switching valve $PV_1$ and the outlet side switching valve $PV_2$, and the internal volume V of the build-down capacity BC is adjusted by adjusting the internal volume of the pressure chamber CH. In order to increase the opening/closing rate of both the switching valves $PV_1$ and $PV_2$, a piezoelectric drive metal diaphragm type normal closing valve is used. The piezoelectric drive metal diaphragm type normal closing valve itself is known, and therefore a description thereof is omitted.

The pressure chamber CH is formed with two cylinders of an outer cylinder CHa and an inner cylinder CHb and the gap G between the outer and inner cylinders CHa and CHb is selected to be 1.8 mm in this example. This example has a configuration in which the internal volume of the pressure chamber CH is selected to be about 1.3 to 12 cc, and the pressure difference detecting pressure sensor P3 is attached thereto.

In this example, the volume of the pressure chamber CH can be freely selected, the diameter of all of the gas flow passages $L_1$, $L_2$, $L_4$, etc. can be uniformly set to the same small diameter (for example, 1.8 mmφ), and the internal volume of the build-down capacity BC can be correctly and easily set to a predetermined capacity value.

Specifically, five kinds of chambers having sizes shown in Table 3 in which the gap G was set to 1.8 mm to 3.6 mm were created as a chamber CH for test. The chambers were applied to the test device of FIG. 1, and then the relationship of the gas flow rate (sccm), the pressure drop inclination (kPa/sec), and the pressure drop time (sec) and the like, and the like were examined.

Figure 1:
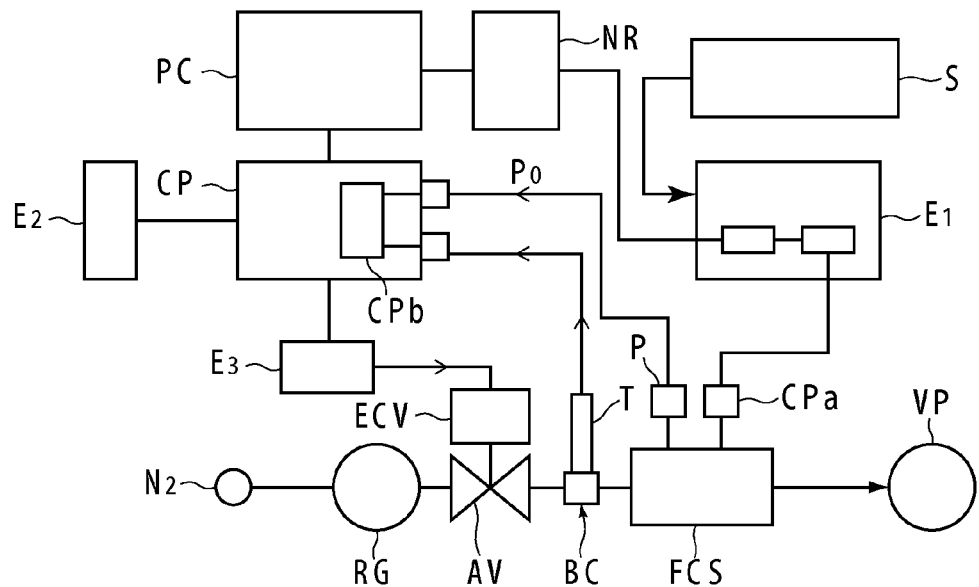
FIG. 1 is a schematic configuration view of a test device for measuring a flow monitoring characteristic of a pressure-type flow control device with build-down type flow volume monitor.

In the examination using the test device of FIG. 1, the flow sensor T was attached and fixed to the outer surface of the chamber CH. The volume of the gas flow passages $L_2$ and $L_4$ other than the chamber CH is 0.226 cc.

TABLE 3

| Chamber A | | |
| --- | --- | --- |
| Gap | 1.8 | mm |
| Height | 14.0 | mm |
| Diameter | 18.0 | mm |
| Chamber | 1.58 | cc |
| Another flow passage volume | 0.226 | cc |
| Actual total volume | 2.31 | cc |
| Chamber B | | |
| Gap | 1.8 | mm |
| Height | 92.0 | mm |
| Diameter | 18.0 | mm |
| Chamber | 8.72 | cc |
| Another flow passage volume | 0.226 | cc |
| Actual total volume | 9.70 | cc |
| Chamber C | | |
| Gap | 2.4 | mm |
| Height | 92.0 | mm |
| Diameter | 18.0 | mm |
| Chamber | 11.15 | cc |
| Another flow passage volume | 0.226 | cc |
| Actual total volume | 11.55 | cc |
| Chamber D | | |
| Gap | 3.0 | mm |
| Height | 92.0 | mm |
| Diameter | 18.0 | mm |
| Chamber | 13.35 | cc |

TABLE 3-continued

| Another flow passage volume | 0.226 | cc |
| --- | --- | --- |
| Actual total volume | 13.91 | cc |
| Chamber E | | |
| Gap | 3.6 | mm |
| Height | 92.0 | mm |
| Diameter | 18.0 | mm |
| Chamber | 15.31 | cc |
| Another flow passage volume | 0.226 | cc |
| Actual total volume | 15.45 | cc |

Figure 2:
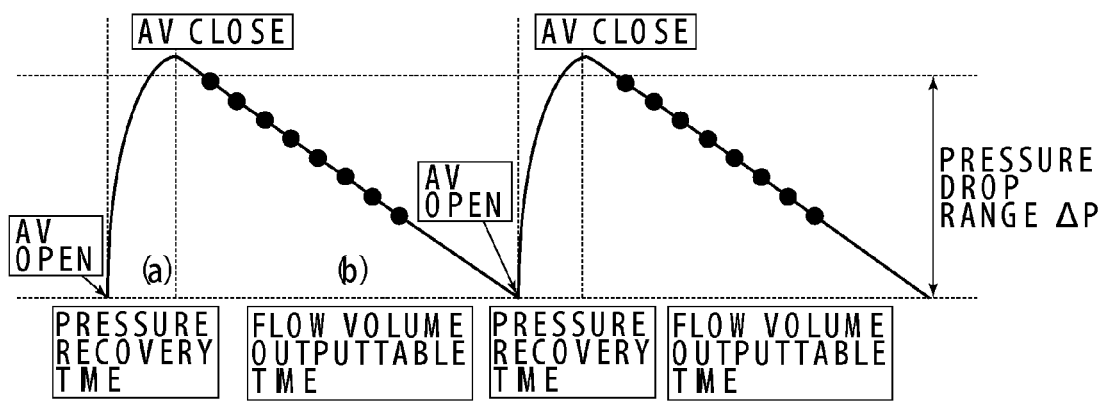
FIG. 2 is an explanation view of a pressure drop state of the build-down type flow monitor.
Figure 3:
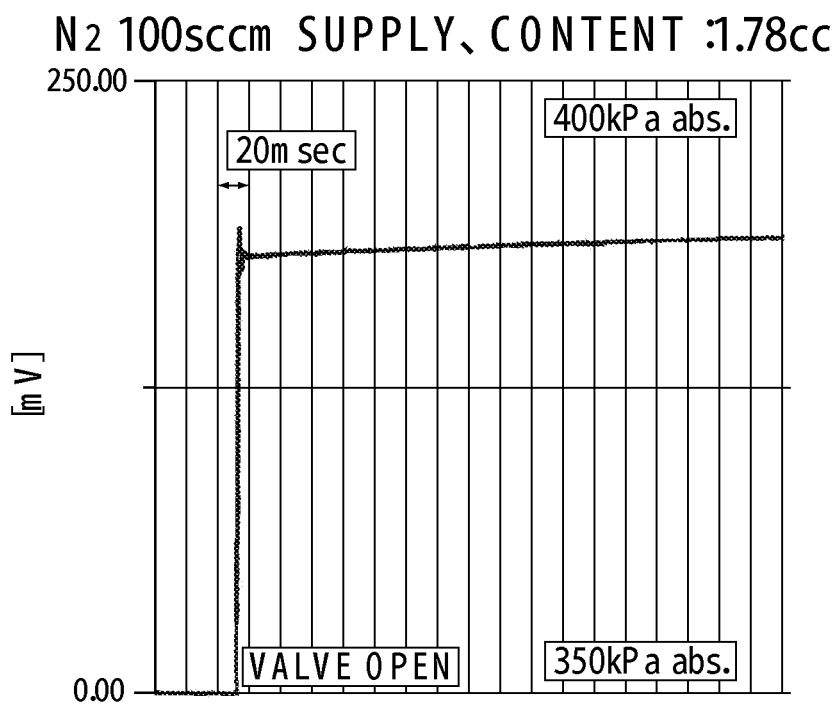
FIG. 3 shows an example of a pressure recovery characteristic curve when measuring a build-down flow rate.
Figure 4:
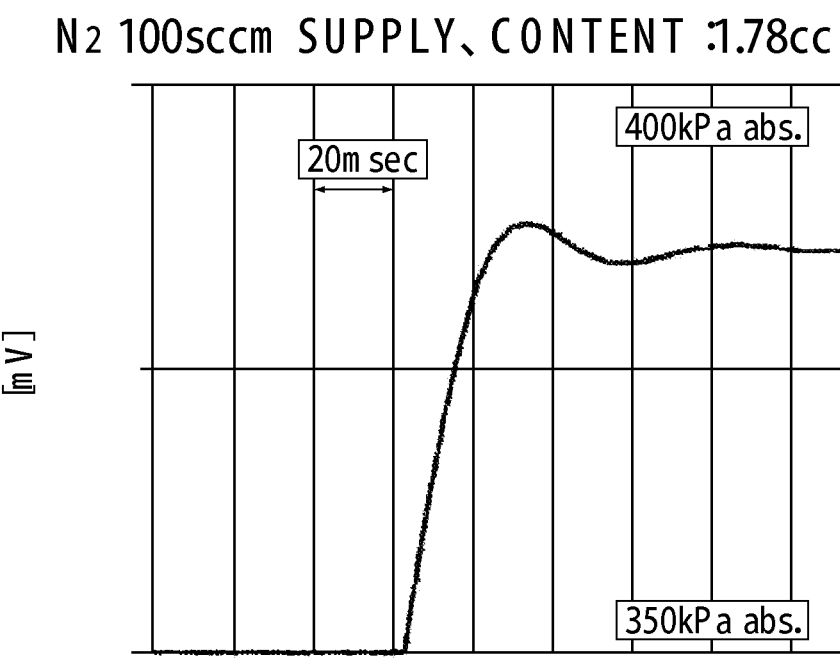
FIG. 4 is a partially enlarged view of FIG. 3.
Figure 5:
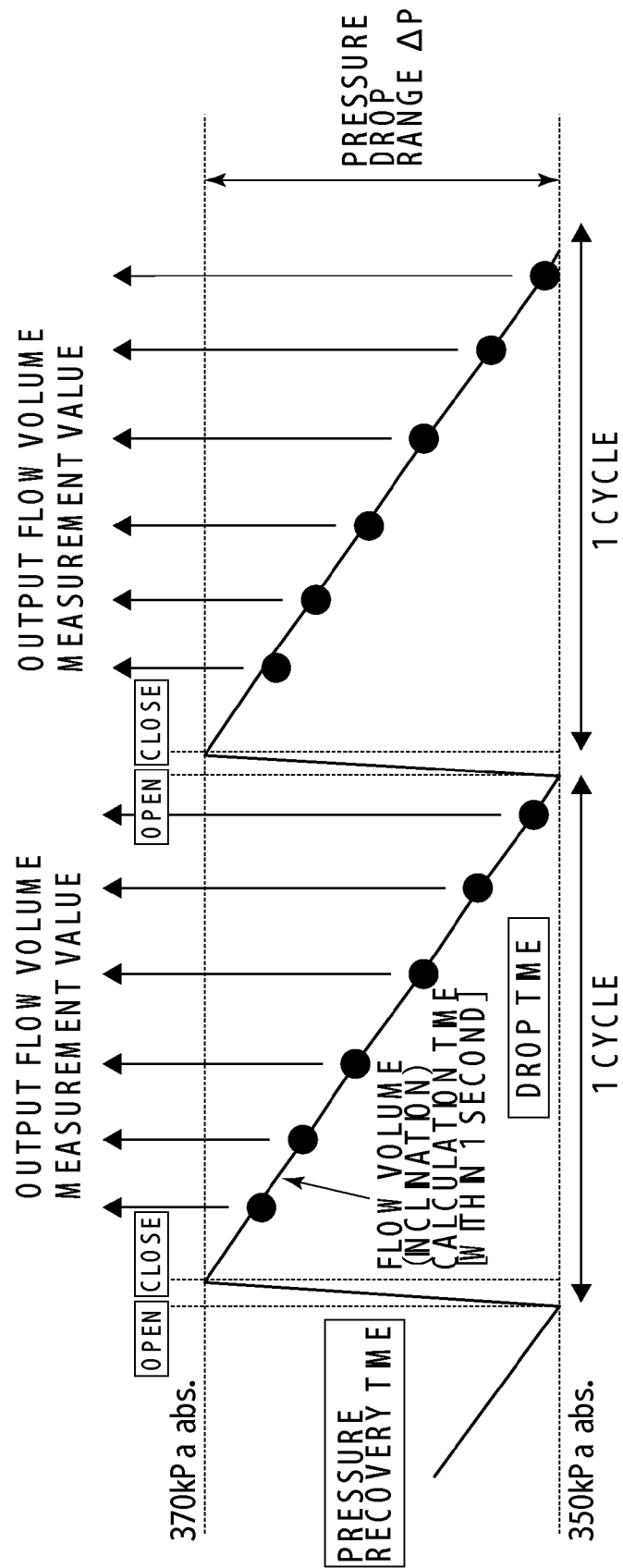
FIG. 5 shows a pressure recovery characteristic curve in Test 1.
Figure 14:
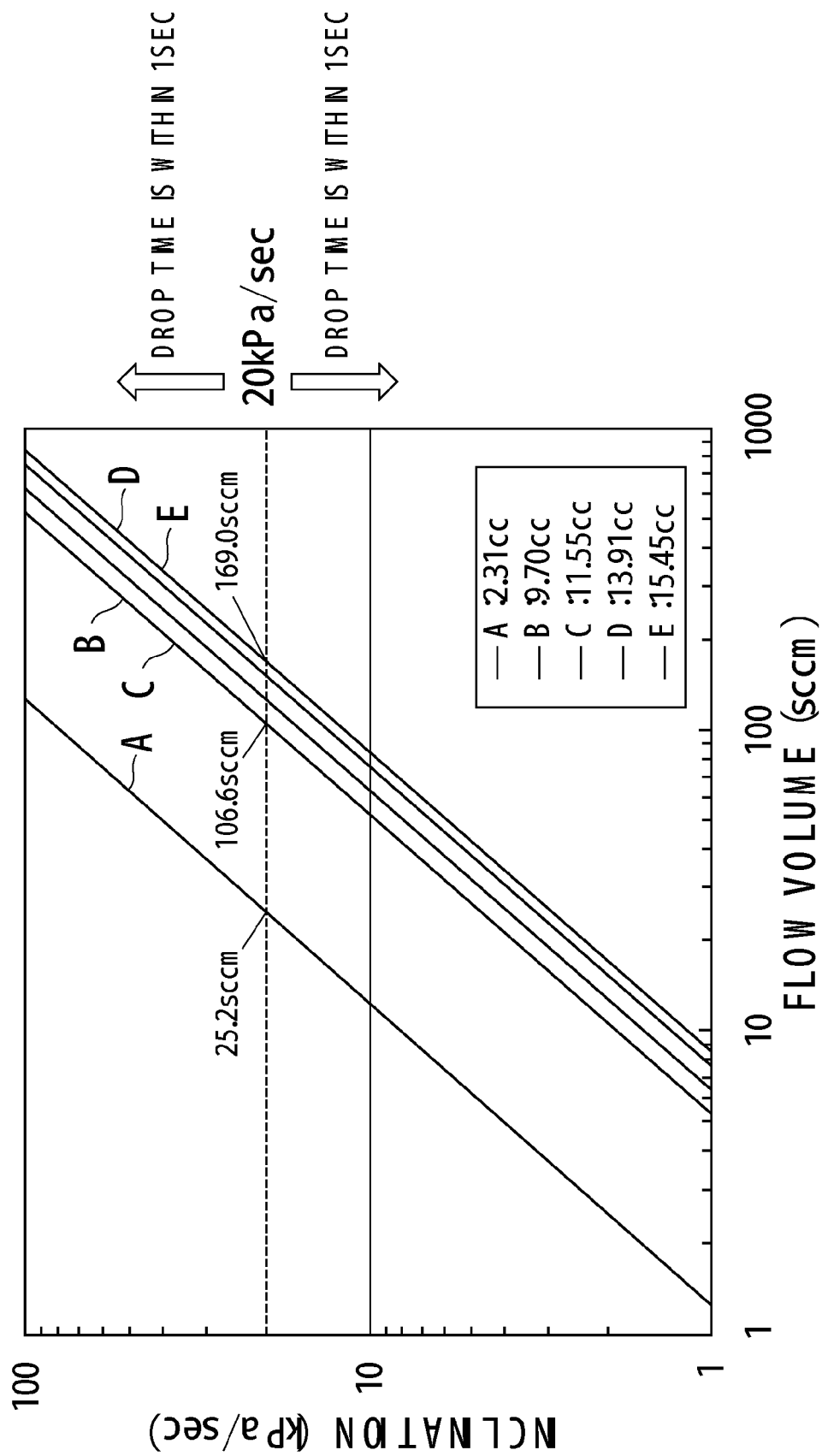
FIG. 14 is a diagram showing the relationship between a gas flow rate sccm and the pressure drop inclination kPa/sec when the measurable time is set to 1 second or less in each of chambers A to E used in this example.

FIG. 14 shows the results obtained by measuring the relationship between the gas flow rate (sccm) and the pressure drop inclination (kPa/sec) when the pressure drop time (b) in FIG. 2 was set to be within 1 second about each of the chambers A to E and the actual buildup capacity of each chamber in the state where the chamber was attached to the test device was 2.31 cc to 15.45 cc.

As is clear from FIG. 14, it is found that, when the pressure drop range ΔP was set to 20 kPa/sec, the flow measurement can be achieved as follows: 25.2 sccm in the case of the chamber A, 106.6 sccm in the case of the chamber B, and 169.0 sccm in the case of the chamber E.

Figure 6:
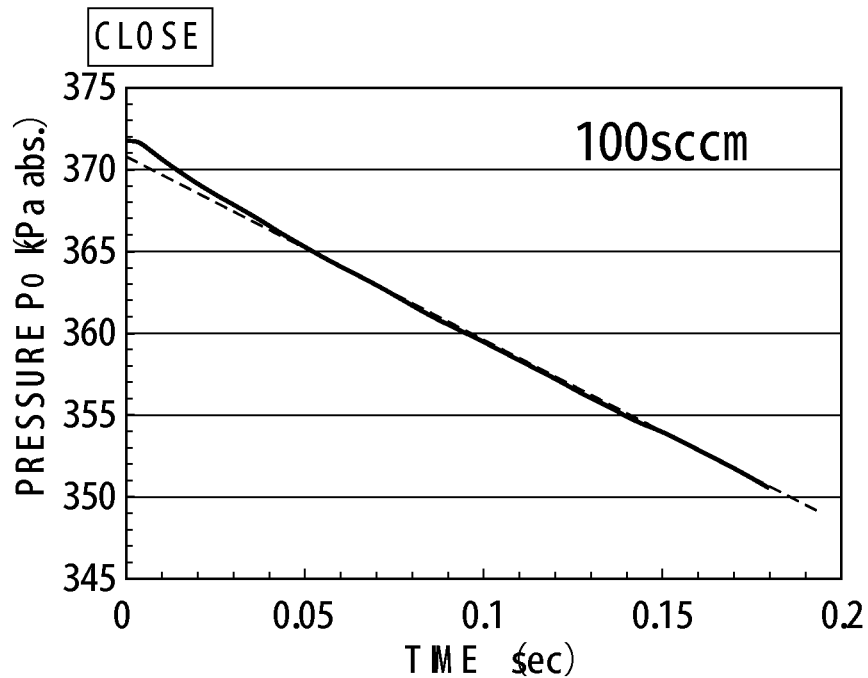
FIG. 6 shows the form of the pressure drop characteristic (Controlled flow rate=100 sccm).
Figure 7:
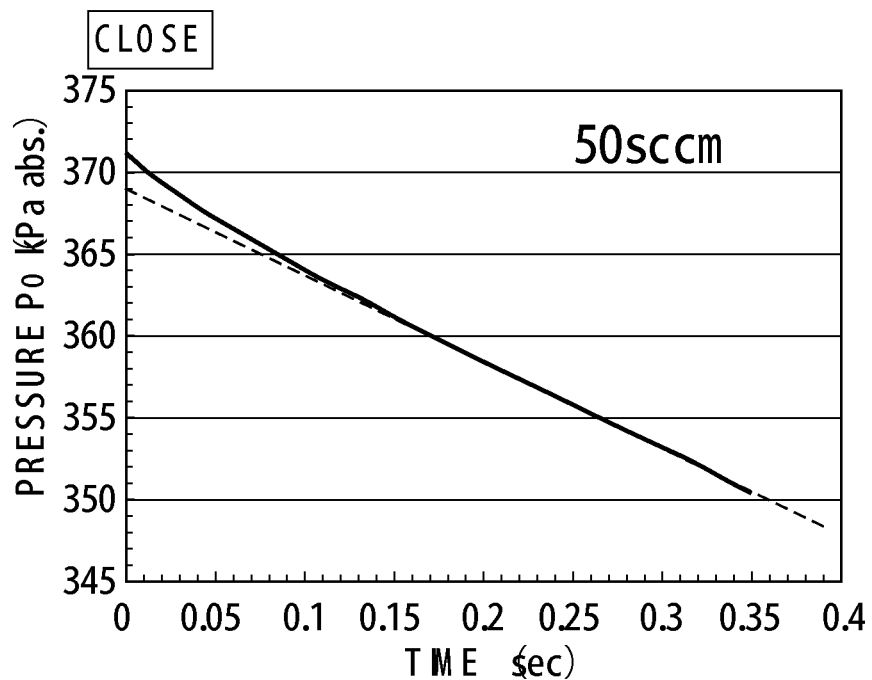
FIG. 7 shows the form of the pressure drop characteristic (Controlled flow rate=50 sccm).
Figure 8:
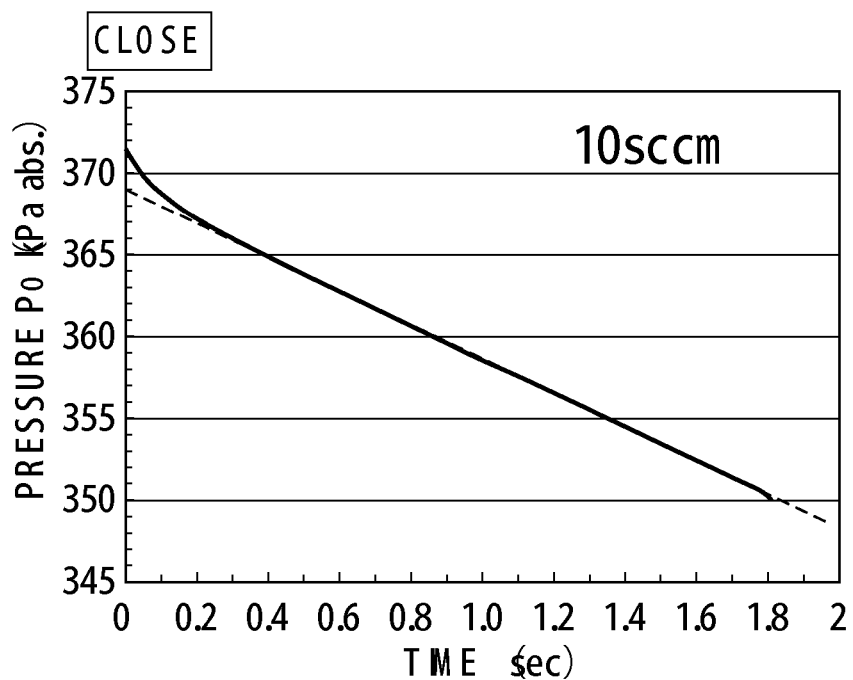
FIG. 8 shows the form of the pressure drop characteristic (Controlled flow rate=10 sccm).
Figure 15:
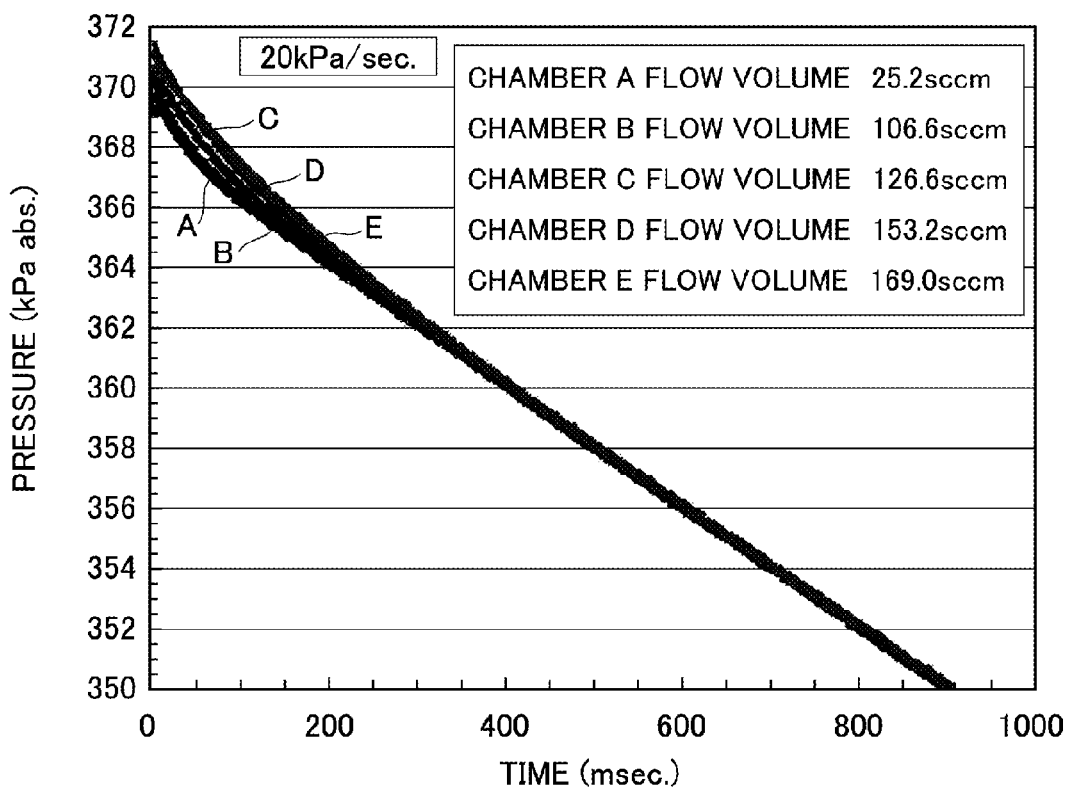
FIG. 15 shows the form of the pressure drop characteristic when the pressure drop inclination of each of the chambers A to E used in this example is 20 kPa(s)/sec.

In the test device of FIG. 1, FIG. 15 shows the linearity of the pressure drop when the gas flow rate was adjusted so that the pressure drop inclination was 20 kPa/sec and is the same diagram as those of FIG. 6 to FIG. 8 described above. The measurement data are acquired by the data logger NR of FIG. 1.

As is clear from FIG. 15, it is found that, in the case of the chamber CH in which the internal volume V of the build-down capacity BC is small (i.e., chambers A and B and the like), the linearity of the pressure drop characteristic becomes good.

Figure 9:
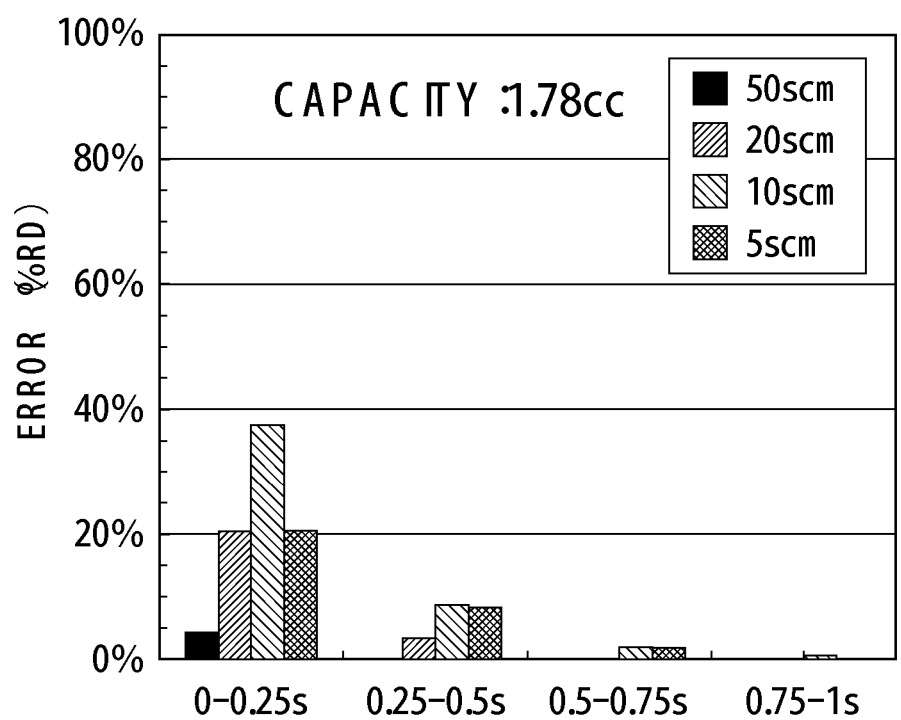
FIG. 9 is a diagram showing the relationship between the lapsed time from closing of a primary side opening/closing switching valve (upstream side valve) AV and flow rate stability (Build-down capacity BC=1.78 cc).
Figure 10:
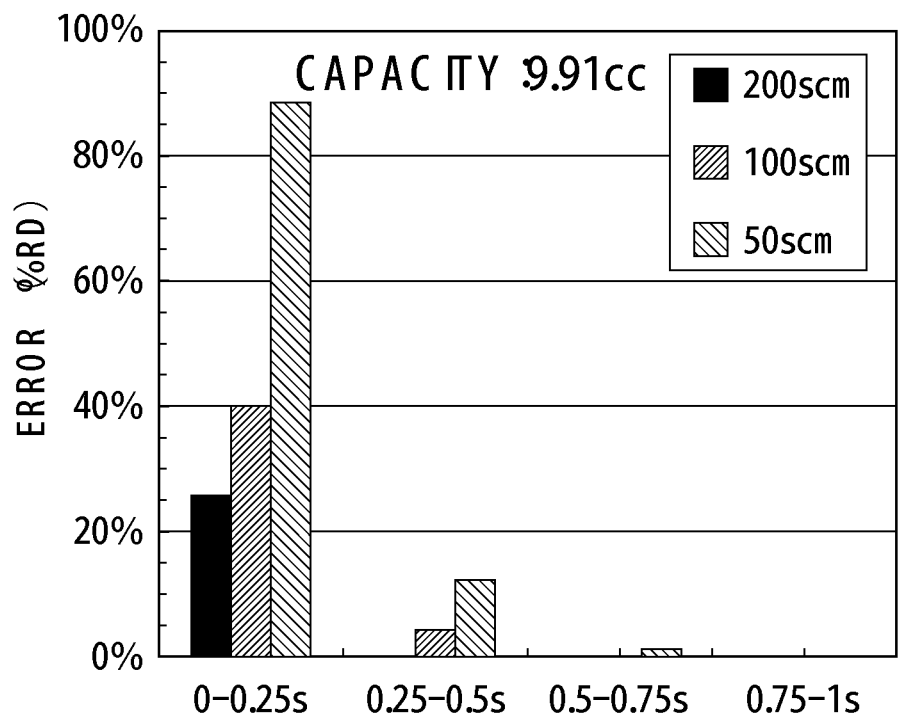
FIG. 10 is a diagram showing the relationship between the lapsed time from closing of the primary side opening/closing switching valve (upstream side valve) valve AV and flow rate stability (Build-down capacity BC=9.91 cc).
Figure 16:
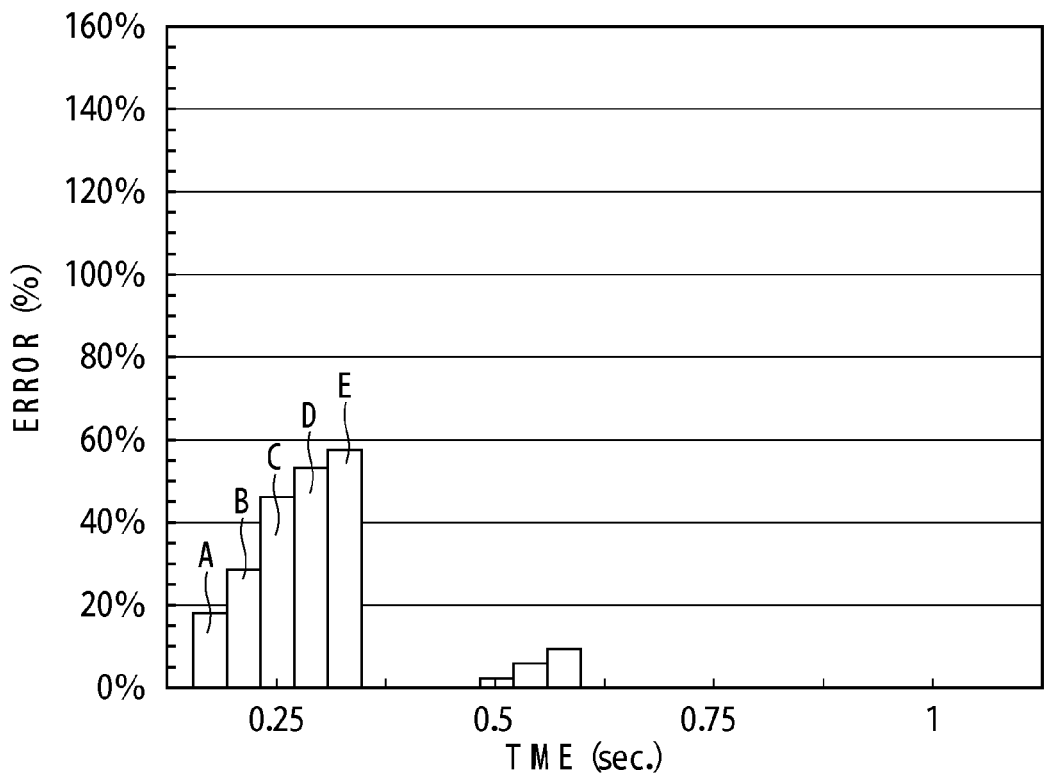
FIG. 16 is a diagram showing the relationship of the lapsed time from closing of the primary side opening/closing switching valve (upstream side valve) AV and flow rate stability of each of the chambers A to E used in this example.

In FIG. 16, the flow measurement error due to the deviation from the linearity of the pressure drop characteristic curve is determined by measuring the flow rate at five points every 0.25 second within the flow rate measurable time (b) within 1 second in the same manner as in the cases of FIG. 9 and FIG. 10 and it is found that the flow rate error decreases at an early stage after the start of the pressure drop in the chambers A and B having a small buildup capacity BC (i.e., it can be said that the linearity of the pressure drop characteristic is excellent).

Figure 11:
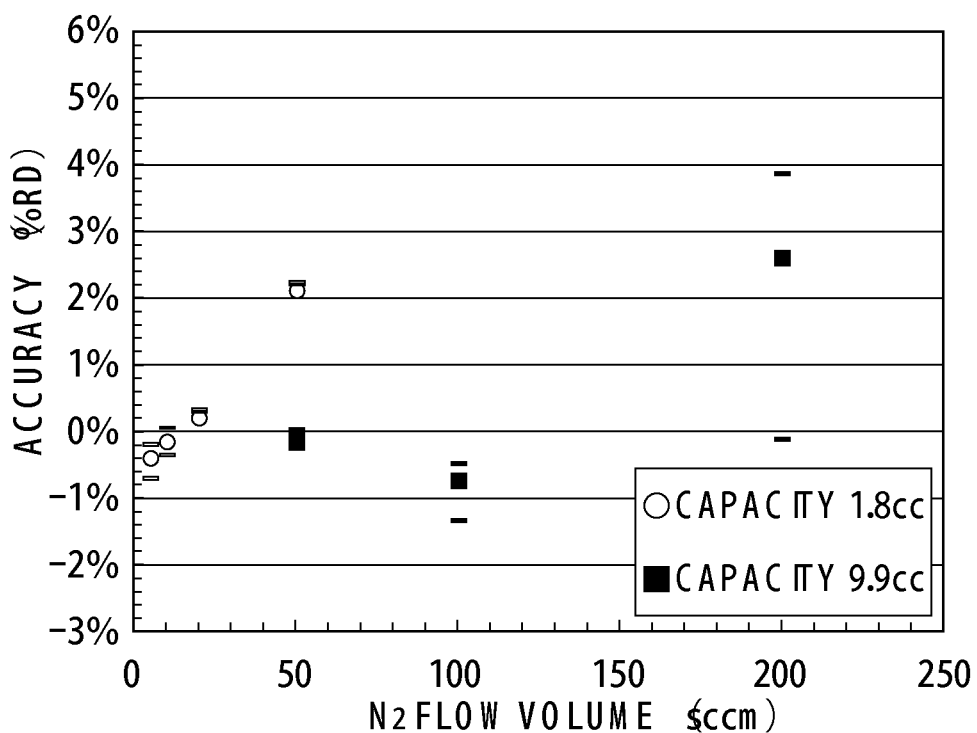
FIG. 11 shows the flow rate accuracy when repeatedly performing measurement 10 times.
Figure 17:
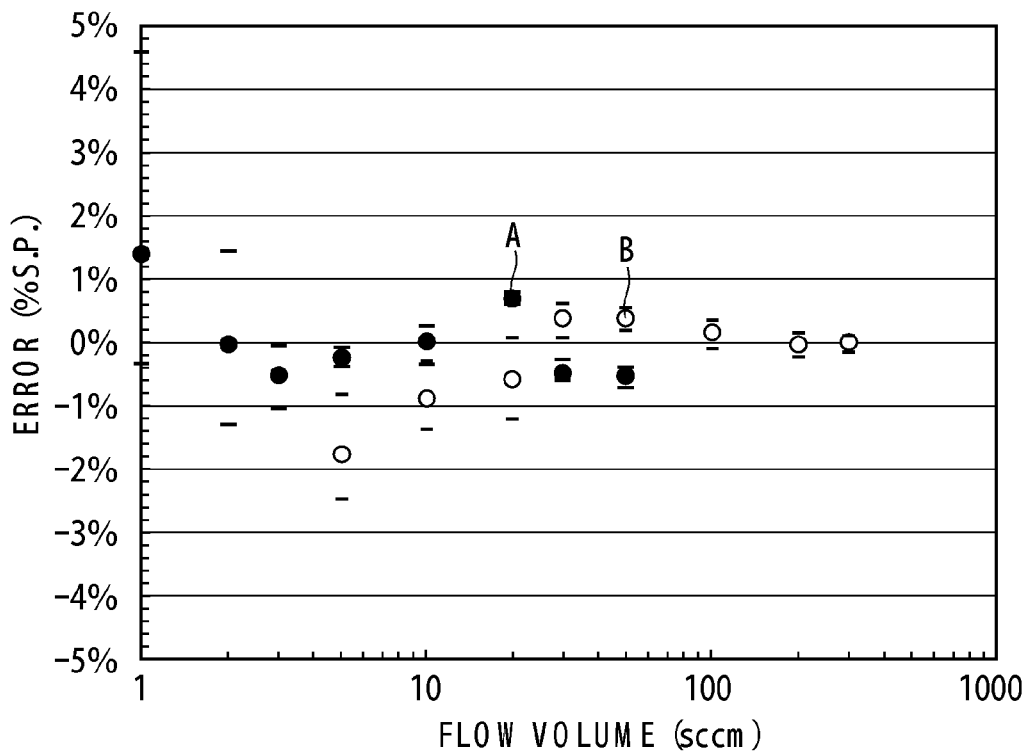
FIG. 17 is a diagram showing the relationship between flow rate accuracy % S.P. and the flow rate sccm in the repeated measurement of the chamber A and the chamber B used in this example.

FIG. 17 shows the results of examining the reproducibility of the flow measurement accuracy about the chamber A and the chamber B and the examination was performed for the same purpose as that of FIG. 11.

In the reproducibility test of the flow measurement accuracy, the primary side change opening/closing valve (upstream side valve) AV is closed, and then the measurement is performed after a predetermined waiting time in order to stabilize the pressure drop inclination and the measurement is performed over a long period of time in order to obtain reproducibility but the flow rate output time is set to be within 1 second in any case.

As is clear from FIG. 17, it is found that, in the case of the chamber A, the flow rate 3 to 50 sccm is the applicable range and, in the case of the chamber B, the flow rate 30 to 300 sccm is the applicable range in terms of reproducibility.

Table 4 shows the basic data used for the creation of the diagram showing the reproducibility of the flow measurement accuracy shown in the FIG. 17 and the chamber A (Internal volume V of the build-down capacity BC=2.31 cc) and the chamber B (Internal volume V of the build-down capacity BC=9.47 cc) were the test targets.

TABLE 4

| Chamber A (BC = 2.31 cc) | | | | | | | | | |
|---|---|---|---|---|---|---|---|---|---|
| Flow rate | sccm | 1 | 2 | 3 | 5 | 10 | 20 | 30 | 50 |
| Temperature | °C. | 22.7 | 23.0 | 23.1 | 22.8 | 22.6 | 22.6 | 22.6 | 22.7 |
| Inclination | kPa/sec | 0.8 | 1.6 | 2.4 | 4.0 | 7.9 | 16.1 | 23.4 | 39.2 |
| Measurement start pressure | kPa abs. | 370 | 370 | 370 | 370 | 370 | 370 | 370 | 370 |
| Measurement end pressure | kPa abs. | 368 | 365 | 365 | 363 | 355 | 350 | 350 | 350 |
| Measurement pressure range | kPa | 2 | 5 | 5 | 7 | 15 | 20 | 20 | 20 |
| Measurement time | sec | 2.73 | 3.42 | 2.28 | 1.91 | 2.05 | 1.37 | 0.91 | 0.55 |

| Chamber B (BC = 9.47 cc) | | | | | | | | | |
|---|---|---|---|---|---|---|---|---|---|
| Flow rate | sccm | 5 | 10 | 20 | 30 | 50 | 100 | 200 | 300 | 400 |
| Temperature | °C. | 22.7 | 23.0 | 22.4 | 22.4 | 22.5 | 22.5 | 22.5 | 22.6 | 22.59 |
| Inclination | kPa/sec | 0.9 | 1.9 | 3.8 | 5.7 | 9.4 | 18.9 | 37.7 | 57.3 | 77.204 |
| Measurement start pressure | kPa abs. | 370 | 370 | 370 | 370 | 370 | 370 | 370 | 370 | 370 |
| Measurement end pressure | kPa abs. | 368 | 367 | 365 | 360 | 350 | 350 | 350 | 350 | 350 |
| Measurement pressure range | kPa | 2 | 3 | 5 | 10 | 20 | 20 | 20 | 20 | 20 |
| Measurement time | sec | 2.24 | 1.68 | 1.40 | 1.87 | 2.24 | 1.12 | 0.56 | 0.37 | 0.28 |

*Measurement was performed while changing the time and the pressure range in such a manner as not to exceed 10000 data.

Figure 18:
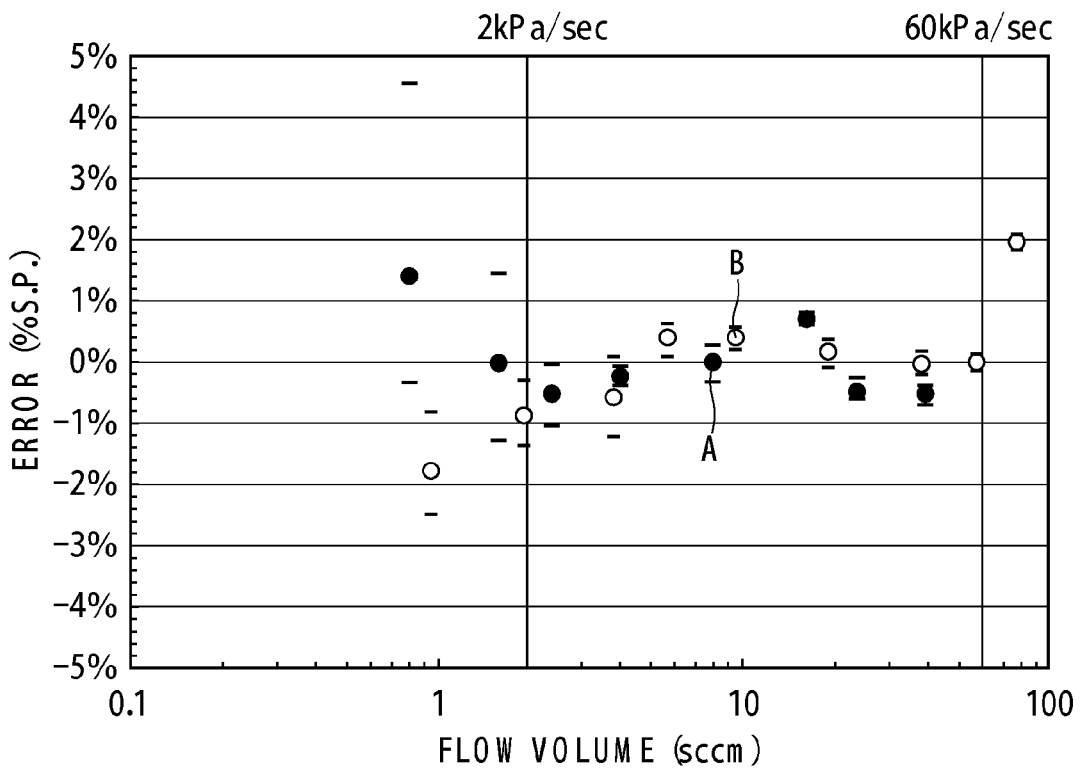
FIG. 18 is a diagram showing the relationship between the flow rate accuracy % S.P. and the pressure drop inclination kPa/sec in the repeated measurement of the chamber A and the chamber B used in this example.
Figure 19:
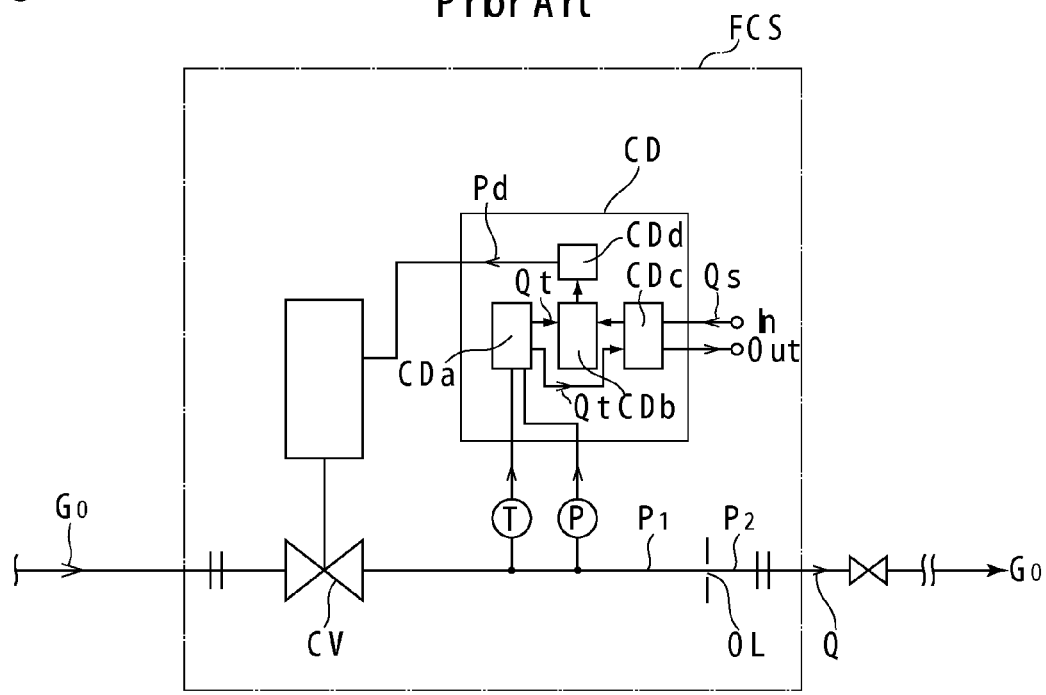
FIG. 19 is the basic configuration view of a former pressure-type flow control device.
Figure 20:
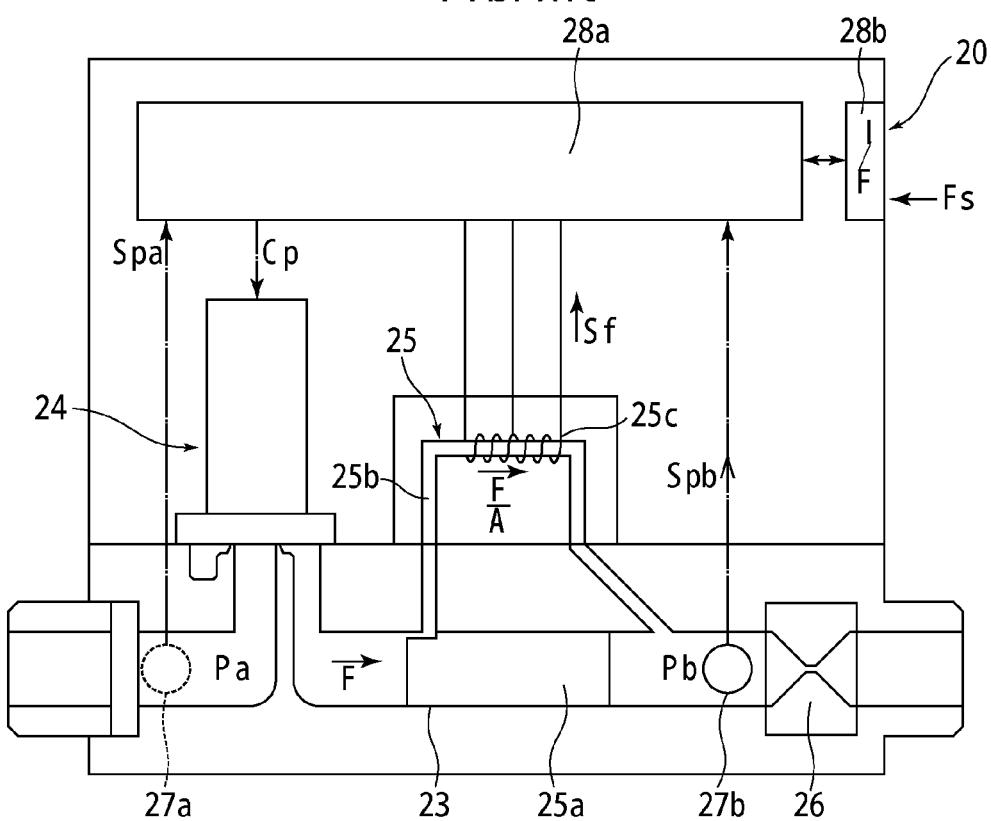
FIG. 20 is the basic configuration view of a former pressure-type flow control device equipped with flow monitor.

FIG. 18 shows the results of examining the relationship between the pressure drop inclination kPa/sec and the error % S.P. of the chamber A and the chamber B from the data of Table 4 and shows that, when the pressure drop inclination is within the range of 2 to 60 kPa/sec, the flow measurement error % S.P. is within the range of ±1%.

INDUSTRIAL APPLICABILITY

The present invention can be applied to a gas supplying facility for a semiconductor manufacturing apparatus and also can be widely applied to a gas supplying facility for a chemical manufacturing device insofar as it is a pressure-type flow control device employing an orifice or a critical nozzle.

EXPLANATION OF REFERENCE NUMERALS

BDM Build-down type flow monitor unit
FCS Pressure-type flow control unit (pressure-type flow control device)
AV Primary side opening/closing switching valve (upstream side valve)
BC Build-down capacity
V Internal volume of build-down capacity
RG Pressure regulator
$N_2$ $N_2$ supply source
T Temperature sensor (temperature measuring resistor)
$P_1$, $P_2$ Pressure sensor
$P_3$ Pressure difference detecting pressure sensor
CV Control valve
OL Orifice
$OL_1$ Small diameter orifice
$OL_2$ Large diameter orifice
OIP External input/output circuit
OLV Orifice switching valve
$VB_1$ Monitor inlet side block
$VB_2$ Monitor outlet side block
$VB_3$ Flow control unit inlet side block
$VB_4$ Flow control unit outlet side block
$VB_5$ Connection portion gasket
CT Signal transmission circuit (digital communication circuit)
CP Calculation control unit
CPa Flow rate calculation control unit
CPb Monitored flow rate calculation control unit
$E_1$ Power supply for pressure-type flow control device
$E_2$ Power supply for calculation control unit
$E_3$ Power supply for electromagnetic valve
ECV Electric operated driving unit
NR Data logger
S Signal generator
PC Calculation displaying unit
$PV_1$ Inlet side switching valve (inlet side piezoelectric switching valve)
$PV_2$ Outlet side switching valve (outlet side piezoelectric switching valve)
$L_1$ Gas inlet side passage of inlet side piezoelectric switching valve
$L_2$ Gas outlet side passage of inlet side piezoelectric switching valve
$L_3$ Gas inlet side passage of outlet side piezoelectric switching valve
$L_4$ Gas outlet side passage of outlet side piezoelectric switching valve
Cu Cupper bar piece
Q Monitored flow rate (build-down flow rate)
CH Chamber
CHa Outer cylinder
CHb Inner cylinder
$Q_sR$ Set flow rate value adjustment mechanism
$Q_s$ Set flow rate
$Q_s'$ Adjusted flow rate
1 Gas inlet
2 Gas outlet

What is claimed is:

1. A flow control device equipped with flow monitor, comprising:
    a build-down type flow monitor unit provided on an upstream side;
    a flow control unit provided on a downstream side of the build-down type flow monitor unit;
    a signal transmission circuit connecting the build-down type flow monitor unit and the flow control unit and transmitting a monitored flow rate of the build-down type flow monitor unit to the flow control unit; and
    a set flow rate value adjustment mechanism for adjusting a set flow rate of the flow control unit based on the monitored flow rate from the build-down type flow monitor unit,
    wherein the flow control unit comprises a control valve, an orifice or a critical nozzle provided on the downstream side of the control valve, a pressure sensor for detecting a pressure between the control valve and the orifice or the critical nozzle, and a flow rate calculation control unit configured to calculate a flow rate of gas flowing through the orifice or the critical nozzle based on a measurement output from the pressure sensor and control the control valve, and
    the flow control unit comprises an additional pressure sensor provided on a downstream side of the orifice or the critical nozzle.

2. The flow control device equipped with flow monitor according to claim 1, wherein
    the set flow rate value adjustment mechanism further includes a comparator for the monitored flow rate and the set flow rate, the set flow rate value adjustment mechanism being configured to automatically correct the set flow rate to the monitored flow rate when a difference between the monitored flow rate and the set flow rate exceeds a preset value.

3. The flow control device equipped with flow monitor according to claim 1, wherein
    a flow rate calculation control unit of the flow control unit and a monitored flow rate calculation control unit of the build-down type flow monitor unit are integrally formed.

4. The flow control device equipped with flow monitor according to claim 1, wherein
    the build-down type flow monitor unit includes:
    a primary side opening/closing switching valve for opening and closing a flow of gas from a gas supply source;
    a build-down capacity connected to an outlet side of the primary side opening/closing switching valve and having a predetermined internal volume;
    a temperature sensor for detecting a temperature of the gas flowing through the build-down capacity;
    a pressure sensor for detecting a pressure of the gas flowing through the build-down capacity; and
    a monitored flow rate calculation control unit which controls opening and closing of the primary side opening/closing switching valve and also which opens the primary side opening/closing switching valve to set a gas pressure in the build-down capacity to a set upper limit pressure value, and then closes the primary side opening/closing switching valve to reduce the gas pressure to a set lower limit pressure value after passage of predetermined time to thereby calculate and output a monitored flow rate by a build-down system, and
    the monitored flow rate is calculated by an equation below in which T denotes a gas temperature (° C.), V denotes an internal volume (liter) of the build-down capacity, ΔP denotes a pressure drop range (Torr) which is a difference between the set upper limit pressure value and the set lower limit pressure value, and Δt denotes time (second) from the closing to the opening of the primary side opening/closing switching valve, $$Q = \frac{1000}{760} \times 60 \times \frac{273}{(273+T)} \times V \times \frac{\Delta p}{\Delta t}.$$

5. The flow control device equipped with flow monitor according to claim 4, wherein
    the predetermined internal volume of the build-down capacity is 0.5 to 20 cc, the set upper limit pressure value is 400 to 100 kPa abs., and the set lower limit pressure value is 350 kPa abs. to 50 kPa abs., and the time Δt is 0.5 to 5 seconds.

6. The flow control device equipped with flow monitor according to claim 4, wherein
    the primary side opening/closing switching valve is a piezoelectric drive type metal diaphragm valve or an electromagnetic direct acting type electric operated valve, and
    a gas pressure recovery time from the set lower limit pressure value to the set upper limit pressure value by opening of the primary side opening/closing switching valve is shorter than a gas pressure drop time from the set upper limit pressure value to the set lower limit pressure value.

7. A flow control device equipped with flow monitor, comprising:
    a build-down type flow monitor unit provided on an upstream side;
    a flow control unit provided on a downstream side of the build-down type flow monitor unit;
    a signal transmission circuit connecting the build-down type flow monitor unit and the flow control unit and transmitting a monitored flow rate of the build-down type flow monitor unit to the flow control unit; and
    a set flow rate value adjustment mechanism being provided in the flow control unit and adjusting a set flow rate of the flow control unit based on the monitored flow rate from the build-down type flow monitor unit, wherein
    the build-down type flow monitor unit includes a build-down chamber and
    the chamber is configured so that an inner cylinder and an outer cylinder are concentrically arranged and fixed, a space between the inner cylinder and the outer cylinder which form the chamber is used as a gas flow passage, and a pressure sensor is provided in the chamber.

* * * * *